US012683687B2

(12) United States Patent　　　　(10) Patent No.: US 12,683,687 B2
Mertz　　　　　　　　　　　　　　　(45) Date of Patent: Jul. 14, 2026

(54) CHROMATIC DISPERSION OPTICAL TIME DOMAIN REFLECTOMETRY ON SUBMARINE COMMUNICATION CABLES USING COHERENT OPTICAL TRANSPONDERS

(71) Applicant: Infinera Corp., San Jose, CA (US)

(72) Inventor: Pierre H. Mertz, Baltimore, MD (US)

(73) Assignee: Infinera Corp.

( * ) Notice: Subject to any disclaimer, the term of this patent is extended or adjusted under 35 U.S.C. 154(b) by 387 days.

(21) Appl. No.: 18/408,344

(22) Filed: Jan. 9, 2024

(65) Prior Publication Data

US 2024/0235685 A1　　Jul. 11, 2024

Related U.S. Application Data

(60) Provisional application No. 63/437,959, filed on Jan. 9, 2023.

(51) Int. Cl.
　　*H04B 10/40*　　　(2013.01)
　　*H04B 10/508*　　(2013.01)
　　*H04B 10/61*　　　(2013.01)

(52) U.S. Cl.
　　CPC ........... *H04B 10/40* (2013.01); *H04B 10/508* (2013.01); *H04B 10/6161* (2013.01)

(58) Field of Classification Search
　　None
　　See application file for complete search history.

(56) References Cited

U.S. PATENT DOCUMENTS

| | | | | |
|---|---|---|---|---|
| 5,355,250 A * | 10/1994 | Grasso | ............... | H04B 10/2931 |
| | | | | 359/341.44 |
| 6,690,884 B1 * | 2/2004 | Kelty | .................. | H04B 10/695 |
| | | | | 714/704 |
| 2015/0280833 A1 * | 10/2015 | Sun | ........................ | H04B 10/65 |
| | | | | 398/208 |
| 2016/0248513 A1 * | 8/2016 | Saito | .................... | H04B 10/674 |
| 2022/0303014 A1 | 9/2022 | Mertz et al. | | |

OTHER PUBLICATIONS

Mecozzi et al., *Polarization sensing using submarine optical cables*, Optica, Jun. 10, 2021, pp. 788-795, vol. 8, Issue 6.
G. Marra et al., *Optical interferometry-based array of seafloor environmental sensors using a transoceanic submarine cable*, Science 376, May 19, 2022, pp. 874-879 (2022).
L. Moeller, *How the Moon Impacts Subsea Communication Cables*, SubCom, Apr. 14, 2023, arXiv 2304.06905.

* cited by examiner

*Primary Examiner* — Darren E Wolf

(57)　　　　　ABSTRACT

A disclosed optical system comprises a repeater disposed between a first span and a second span of an optical cable and a node receiving an optical signal from the first span and transmitting a reflection to the first span. The node comprises a transmitter coupled to the first span to transmit the optical signal, transmit pulses having a test subcarrier and a tone, and provide a reference pulse; a receiver to receive the reference pulse and the reflection and passing a filter spectrum; and a DSP to: determine a first dispersion based on a first phase of the reference pulse and on a second phase of the reflection of a first pulse; determine a second dispersion based on a third phase of the reference pulse and a fourth phase of the reflection for a second pulse; and determine a first span seismic pressure based on the first and second dispersion.

20 Claims, 12 Drawing Sheets

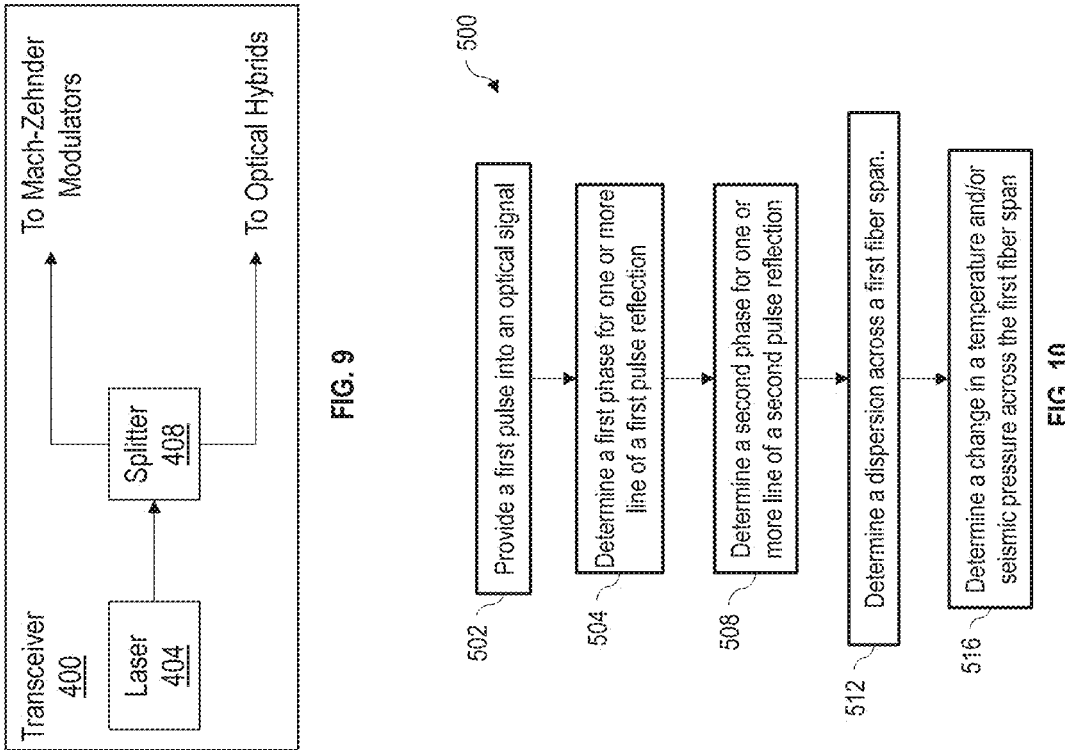

Transceiver
400

Laser
404

Splitter
408

To Mach-Zehnder
Modulators

To Optical Hybrids

502  Provide a first pulse into an optical signal

504  Determine a first phase for one or more line of a first pulse reflection

508  Determine a second phase for one or more line of a second pulse reflection

512  Determine a dispersion across a first fiber span.

516  Determine a change in a temperature and/or seismic pressure across the first fiber span

FIG. 10

CHROMATIC DISPERSION OPTICAL TIME DOMAIN REFLECTOMETRY ON SUBMARINE COMMUNICATION CABLES USING COHERENT OPTICAL TRANSPONDERS

CROSS REFERENCE TO RELATED APPLICATIONS

This application claims the benefit of U.S. Provisional Patent Application No. 63/437,959, filed Jan. 9, 2023, which is hereby incorporated herein by reference in its entirety.

BACKGROUND

Optical communication systems typically include a first node that outputs optical carriers to one or more second nodes. The first and second nodes are connected to each other by one or more segments of optical fiber. At the first node, optical signals, each having a corresponding wavelength, and each being modulated to carry a different data stream, are multiplexed onto the optical fiber. In such systems, a laser and a modulator may be provided to generate each optical signal. Additionally, optical communication systems may include high-speed circuitry and components to generate high-speed optical signals at a transmit end (e.g., first node) of the system. At a receive end (e.g., second node), corresponding high-speed circuitry may be provided to detect the incoming data and to forward or distribute such data to lower capacity nodes. In subsea optical communication systems, one or more optical amplifier, such as an in-line optical amplifier, may be positioned at specific geographic locations between the first node and the second node along the one or more segments of optical fiber.

From time to time, environmental disturbances may occur at one or more location between the first node and the second node and along the one or more segments of fiber; however, real-time seismic sensing is typically performed by land-based seismometers. However, if an earthquake (that is, an environmental disturbance) occurs in the ocean, the delay before sensing the earthquake waves by the land-based seismometers delays any possible warning of a tsunami that may be caused by the earthquake under the ocean. Therefore, it is desirable to measure seismic events using sensors in the ocean. A network of such sensors can also help verify seismologists' models. Moreover, rapidly identifying the location of these environmental disturbances is desired.

Other attempts at seismic sensing may include detecting a seismic event utilizing a coherent receiver coupled to a submarine cable that may sense the state of polarization ("SOP") from a received data stream in an optical signal, and based on the sensed SOP, may detect the seismic event. However, the SOP results from signal propagation over the entire length of the submarine cable, and, therefore, localizing the seismic event may be difficult. Fiber acoustic sensing may be more sensitive to seismic variations than SOP measurements. However, the fiber acoustic sensing measurements are limited to the span before the first submarine in-line node, and require high power and specialized equipment, thus increasing costs.

Further, real-time temperature sensors in the ocean can help climate scientists forecast seasonal and long-term variations, such as from climate patterns like El Nino and La Nina. However, current marine temperature sensors that use real time wireless communication are typically limited to surface temperature measurements. Thus, it is desirable to have a network of temperature sensors at the bottom of the ocean to improve the climate scientists' models.

Prior methods of identifying a location of environmental disturbances, such as providing a sensor network along the optical communication system, are costly, time consuming, and would require additional maintenance.

SUMMARY OF THE INVENTION

Thus, a need exists to identify the location of environmental disturbances utilizing currently deployed subsea optical communication equipment having standard lasers in commercial transponders. It is to such a system and method of using interferometry for achieving phase sensitive measurements and high loss loopbacks of currently deployed subsea optical communication equipment that the present disclosure is directed.

Generally, the present disclosure is directed towards apparatuses and methods for measuring chromatic dispersion by sending a pulsed modulated optical signal (e.g., pulse having a test subcarrier) having a wavelength that overlaps with the HLLB (High Loss Loop Back) FBG (Fiber Bragg grating) in the in-line nodes of a submarine cable. The stream of reflected pulses, one for each repeater, may be analyzed by the receiver DSP of a coherent receiver to measure the chromatic dispersion with high accuracy. If the modulation used for the pulse modulated optical signal is a Nyquist subcarrier with a fixed length pattern, the phases of each comb line may be digitally aligned to measure the absolute chromatic dispersion accurately. If the modulation used for the pulse modulated optical signal is composed of multiple swept frequency tones, chromatic dispersion changes may be measured continuously. For both modulations, the measurements may be for the sum of the dispersion from the transponder to the HLLB and back for each repeater. Comparing the measurements between neighboring repeaters may localize the chromatic dispersion measurement to the fiber span between consecutive repeaters.

Consistent with the present disclosure, a transceiver is provided. The transceiver may comprise an optical source, a modulator, a transmitter module, a coherent receiver, and a digital signal processor. The optical source may be configured to provide an optical signal into a fiber optic cable having one or more optical repeaters forming one or more fiber optic spans. The modulator may be operable to receive the optical signal and is configured to encode data into a plurality of subcarriers in the optical signal. The transmitter module includes circuitry configured to receive data to be encoded into one or more subcarrier of the plurality of subcarriers of the optical signal. The circuitry may include at least one driver circuit supplying drive signals to the modulator to cause the modulator to encode data into a first subcarrier having a first frequency band. The circuitry may be further configured to cause the modulator to generate a first pulse at a first instance in time and a second pulse at a second instance in time, where each of the first pulse and the second pulse comprise a test subcarrier having a test frequency band and an optical tone outside of the test frequency band, into the optical signal. The test frequency band and the first frequency band are different. The coherent receiver may be operable to receive the optical signal from the fiber optic cable, where the optical signal has a filter spectrum. The filter spectrum may be a portion of the optical signal having at least the test subcarrier and the optical tone and where the test subcarrier having one or more comb lines.

The digital signal processor may be operable to: determine a first phase for each of the one or more comb lines of a first pulse reflection in the filter spectrum corresponding to the first pulse and received at a third instance of time, the first phase being determined using the optical tone of the first pulse reflection as a first reference, the third instance in time being between the first instance in time and the second instance in time; determine a second phase for each of the one or more comb lines of a second pulse reflection in the filter spectrum corresponding to the first pulse and received at a fourth instance of time, the second phase being determined using the optical tone of the second pulse reflection as a second reference, the fourth instance being between the third instance and the second instance; determine a first dispersion across a first fiber optic span of the one or more fiber optic spans based at least in part on the first phase and the second phase; determine a third phase for each of the one or more comb lines of a third pulse reflection in the filter spectrum corresponding to the second pulse and received at a fifth instance of time, the third phase being determined using the optical tone of the third pulse reflection as a third reference, the fifth instance being after the second instance; determine a fourth phase for each of the one or more comb lines of a fourth pulse reflection in the filter spectrum corresponding to the second pulse and received at a sixth instance of time, the fourth phase being determined using the optical tone of the fourth pulse reflection as a fourth reference, the sixth instance being after the fifth instance; determine a second dispersion across the first fiber optic span based at least in part on the third phase and the fourth phase; and determine a change to a seismic pressure within the first fiber optic span based on the first dispersion and the second dispersion across the first fiber optic span.

Consistent with the present disclosure, an optical communication system is provided. The optical communication system may comprise a primary node, an optical repeater, and a fiber optic cable. The fiber optic cable may have a first span and a second span. The optical repeater may be optically disposed on the fiber optic cable between the first span and the second span, and is operable to receive an optical signal from the first span and to transmit a pulse reflection of the optical signal along the first span. The primary node may comprise a transmitter module a coherent receiver, and a digital signal processor (DSP). The transmitter module may be optically coupled to the first span of the fiber optic cable, and may be operable to transmit the optical signal having a first subcarrier with encoded data, and to transmit a plurality of pulses having a pulse bandwidth encompassing a test subcarrier and an optical tone, onto the optical signal, where each pulse of the plurality of pulses has a pulse width and a duty cycle.

The transmitter module may further provide a reference pulse of the optical signal. The coherent receiver may be operable to receive the reference pulse and the pulse reflection and to pass a filter spectrum. The filter spectrum may be a portion of the pulse reflection corresponding to the pulse bandwidth. The DSP may be operable to: determine a first dispersion based on a first phase of the reference pulse for a first pulse of the plurality of pulses determined using the optical tone of the reference pulse at a first instance in time, and based on a second phase of the pulse reflection for the first pulse determined using the tone of the pulse reflection in the filter spectrum at a second instance in time after the first instance in time; determine a second dispersion based on a third phase of the reference pulse for a second pulse of the plurality of pulses determined using the optical tone of the reference pulse at a third instance in time after the second instance in time, and based on a fourth phase of the pulse reflection for the second pulse determined using the optical tone of the pulse reflection in the filter spectrum at a fourth instance in time after the third instance in time; and determine a change to a seismic pressure within the first span based on the first dispersion and the second dispersion.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 9 is a diagram of an exemplary embodiment of a transceiver having a shared laser.

FIG. 10 is a flowchart of an exemplary embodiment of a process 500 constructed in accordance with the present disclosure.

DETAILED DESCRIPTION

Figure 1:
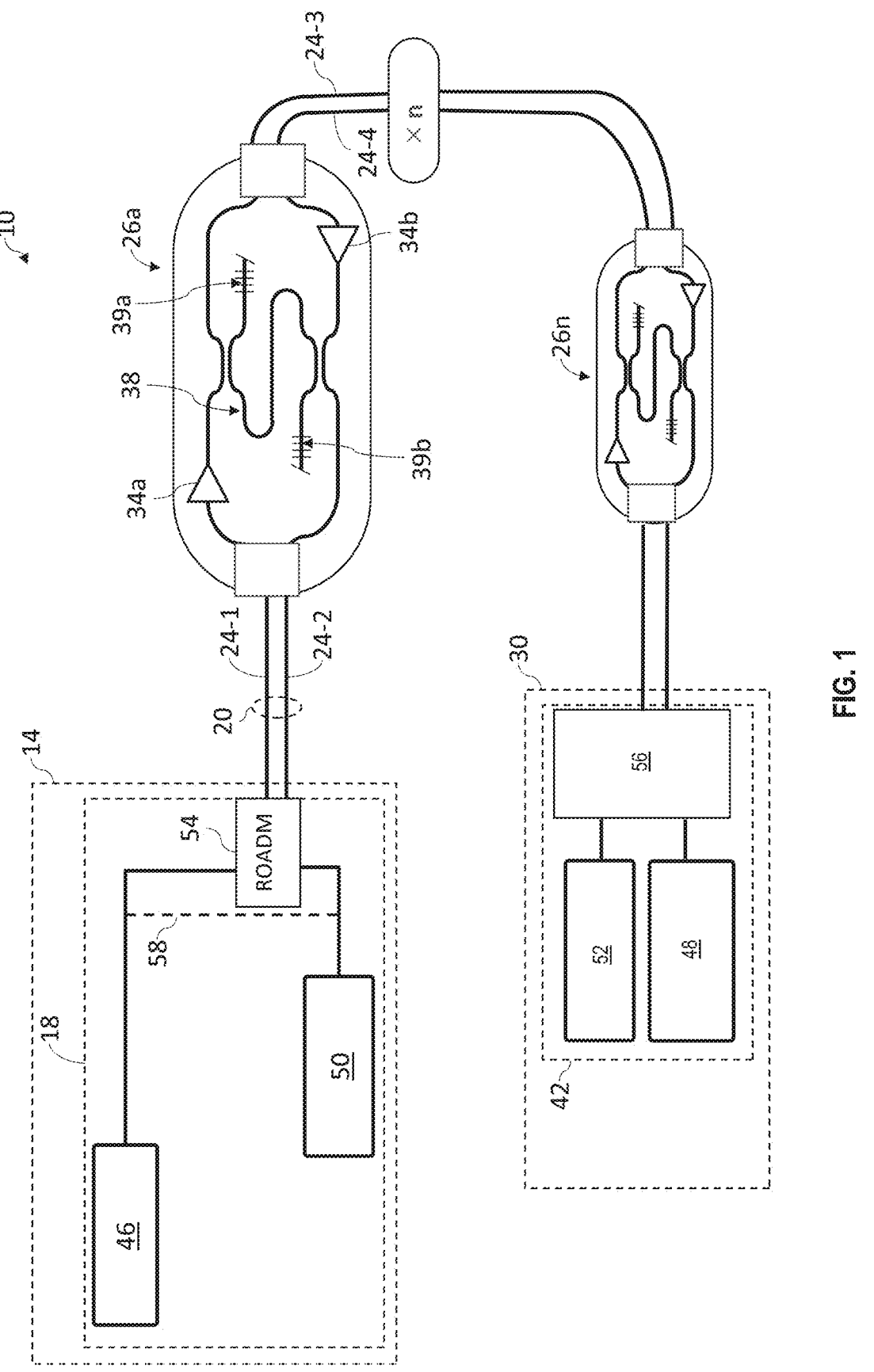
FIG. 1 is a block diagram showing an exemplary embodiment of an optical communication system constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," "an example," "one implementation," some implementations," or "an implementation," means that a particular element, feature, structure, or characteristic described in connection with the embodiment is included in at least one embodiment and may be used in conjunction with other implementations. The appearance of the phrase "in some embodiments" or "one example" or "implementations" in various places in the specification is not necessarily all referring to the same implementation, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of the terms "upstream" and "downstream" are for explanatory purposes, however, it will be understood that the direction of travel of optical data may be reversed.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

The methods and systems herein disclosed may be used in optical networks. In one implementation, the optical network has one or more band, or portion of wavelength. As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a fiber optic span, or optical fiber link, is the spread or extent of a fiber optic cable between the fiber optic cables' terminals. Generally, a fiber optic span is an unbroken or uninterrupted segment of fiber optic cable between amplifiers. For instance, if a fiber optic cable carried a signal from point A through a repeater or amplifier at point B and on to point C, the fiber optic cable is said to have two fiber optic spans, a first fiber optic span from A to B, and a second fiber optic span from B to C, the length of the fiber optic spans being the distance between the respective points. A fiber optic span may also be the distance between amplifiers, even if the fiber optic cable has not been terminated. For example, the fiber optic cable may not be terminated at an optical in-line amplifier.

Referring now to the drawings, and in particular to FIG. 1, shown therein is a diagram of an exemplary embodiment of optical communication system 10 constructed in accordance with the present disclosure. The optical communication system 10 includes, for example, a primary node 14. The primary node 14 may be optically coupled with a secondary node 30 via one or more optical fiber links 24 (referred to collectively as optical fiber links 24). One or more of, or portions of, the optical fiber links 24 may be within, or make, an optical fiber submarine cable 20.

The primary node 14 includes a transceiver module 18, for example, that supplies a downstream optical signal having a plurality of subcarriers and a test subcarrier with an optical tone (e.g., test subcarrier 182 and optical tone 180 described in detail below) to a first optical fiber link 24-1, and receives an upstream signal having at least one reflection of the test subcarrier (described in detail below) from a second optical fiber link 24-2 of the optical fiber links 24.

In one implementation, the optical communication system 10 includes one or more optical repeater 26a-n (referred to collectively as optical repeater 26) between the primary node 14 and the secondary node 30. The optical repeater 26 may in part, boost signals in the optical fiber submarine cable 20. The optical repeater 26 may be constructed as an "optical repeater" that receives, amplifies, and transmits the optical signals thereby increasing a transmission range of the optical signals. Not all optical communication systems 10 utilize optical repeaters 26a-n and the present disclosure may apply to both repeater and repeaterless systems. In one implementation, the optical repeater 26 may be a repeater or an optical in-line amplifier.

The optical repeater 26 may be optically coupled with the primary node 14 via the first and second optical fiber links 24-1, 24-2. The optical repeater 26 may be optically coupled with the secondary node 30 via a third optical fiber link 24-3 and a fourth optical fiber link 24-4 of the optical fiber links 24.

In one implementation, the optical repeater 26 may include one or more amplifiers 34 (such as a first amplifier 34a and a second amplifier 34b, which may be referred to simply as amplifiers 34) and a high loss loopback 38. As shown in FIG. 1, one of the amplifiers 34 may be optically coupled to the first, second, third, and fourth optical fiber links 24-1, 24-2, 24-3, and 24-4 to amplify the optical signal traveling in the downstream and upstream directions. For example, the first amplifier 34a may be operable to amplify the optical signal in the first optical fiber link 24-1 before the optical signal continues downstream to the third optical fiber link 24-3. Similarly, the second amplifier 34b of the optical repeater 26 may amplify an incoming optical signal in the fourth optical fiber link 24-4 before the incoming optical signal continues upstream to the second optical fiber link 24-2. In one implementation, the one or more amplifiers 34 are erbium doped optical amplifiers.

In one implementation, the high loss loopback 38 may be an optical coupler operable to be tuned to a particular wavelength and having a fiber Bragg grating 39 to cause a portion of the optical signal at the tuned wavelength (e.g., the test subcarrier 182) to be inserted into the incoming optical signal in the upstream direction (e.g., the reflection). The high loss loopback 38 may include two fiber Bragg gratings 39 identified as a first fiber Bragg grating 39a and a second fiber Bragg grating 39b. The first fiber Bragg grating 39a has a grating bandwidth and reflects a first portion of the optical signal corresponding to the grating bandwidth and amplified by the first amplifier 34a, to cause the first portion of the optical signal to be inserted onto the second optical fiber link 24-2. The second fiber Bragg grating 39b reflects a second portion of the incoming optical signal having the grating bandwidth and amplified by the second amplifier 34b, to cause the second portion of the incoming optical signal to be inserted onto the third optical fiber link 24-3.

Each optical signal may include one or more optical subcarrier. Collectively, a number of the optical subcarriers output from the secondary transceiver 42 of the secondary node 30 may be equal to, less than, or greater than the number of optical subcarriers output from the transceiver module 18 of the primary node 14.

In one implementation, one or more of the primary node 14 and the secondary node 30 may include a coherent optical time domain reflectometer (COTDR) to perform cable monitoring tests having a high accuracy and traditionally utilized to find optical fiber faults, such as a severed cable.

The optical communication system 10 typically utilizes Wavelength Division Multiplexing (WDM) such as Dense Wavelength Division Multiplexing (DWDM). Dense Wavelength Division Multiplexing multiplexes multiple optical carrier signals onto a single optical fiber by using different laser light wavelengths.

In the optical communication system 10, one or more optical data carrier signals may be transmitted in one or more optical subcarrier (shown in FIG. 4A and discussed below) along with the tone subcarrier through the optical fiber submarine cable 20. In particular, selected subcarriers may be transmitted in the downstream direction from the primary node 14 to the secondary node 30, and other subcarriers may be transmitted in the upstream direction from the secondary node 30 to the primary node 14.

In some implementations, the optical communication system 10 may include one or more additional of the primary node 14 and/or the secondary node 30 and the optical fiber submarine cables 20, fewer of the primary nodes 14 and/or the secondary nodes 30 and the optical fiber submarine cables 20, or may have a configuration different from that described above. For example, the optical communication system 10 may have a mesh configuration or a point-to-point configuration.

As shown in FIG. 1, in one implementation, the transceiver module 18 may generally comprise one or more transmitter module 46 (hereinafter transmitter module 46) and one or more coherent receiver 50 (hereinafter coherent receiver 50) optically coupled to a ROADM 54. The transceiver module 18 may further (optionally) include an optical loopback 58 operable to be tuned to a particular wavelength and cause a portion of the optical signal at the tuned wavelength (e.g., the test subcarrier 182) to be sent from the transmitter module 46 towards the coherent receiver 50 (e.g., as the reflection).

In one implementation, the transmitter module 46 may include the test subcarrier 182 into the optical signal at discrete intervals. In one implementation, the transmitter module 46 may generate a pulse including the test subcarrier and an optical tone at one or more period of time. For example, the transmitter module 46 may cause generation of a first pulse at a first instance in time and a second pulse at a second instance in time, where each of the first pulse and the second pulse include the test subcarrier 182 having a test frequency band and an optical tone outside of the test frequency band and provide each pulse into the optical signal. In one implementation, each pulse may have a pulse width that is less than a propagation duration of the optical signal in the optical fiber submarine cable 20. In one implementation, each pulse may have a duty cycle that is greater than a propagation duration of the optical signal across the optical fiber submarine cable 20. In this way, the transmitter module 46 may ensure that the second pulse sent downstream in the optical signal does not cause a reflection that may interfere with one or more reflections from the first pulse.

In one implementation, the secondary node 30 is constructed similar to and may have a structure similar to and operate in a manner similar to that described above with respect to the primary node 14. In one example, however, a secondary transceiver 42 may supply a modulated optical signal in the upstream direction. The secondary transceiver 42 may comprise, for example, a coherent receiver 52 constructed in accordance with the coherent receiver 50, a transmitter module 48 constructed in accordance with the transmitter module 46, and a ROADM 56 constructed in accordance with the ROADM 54.

Figure 2:
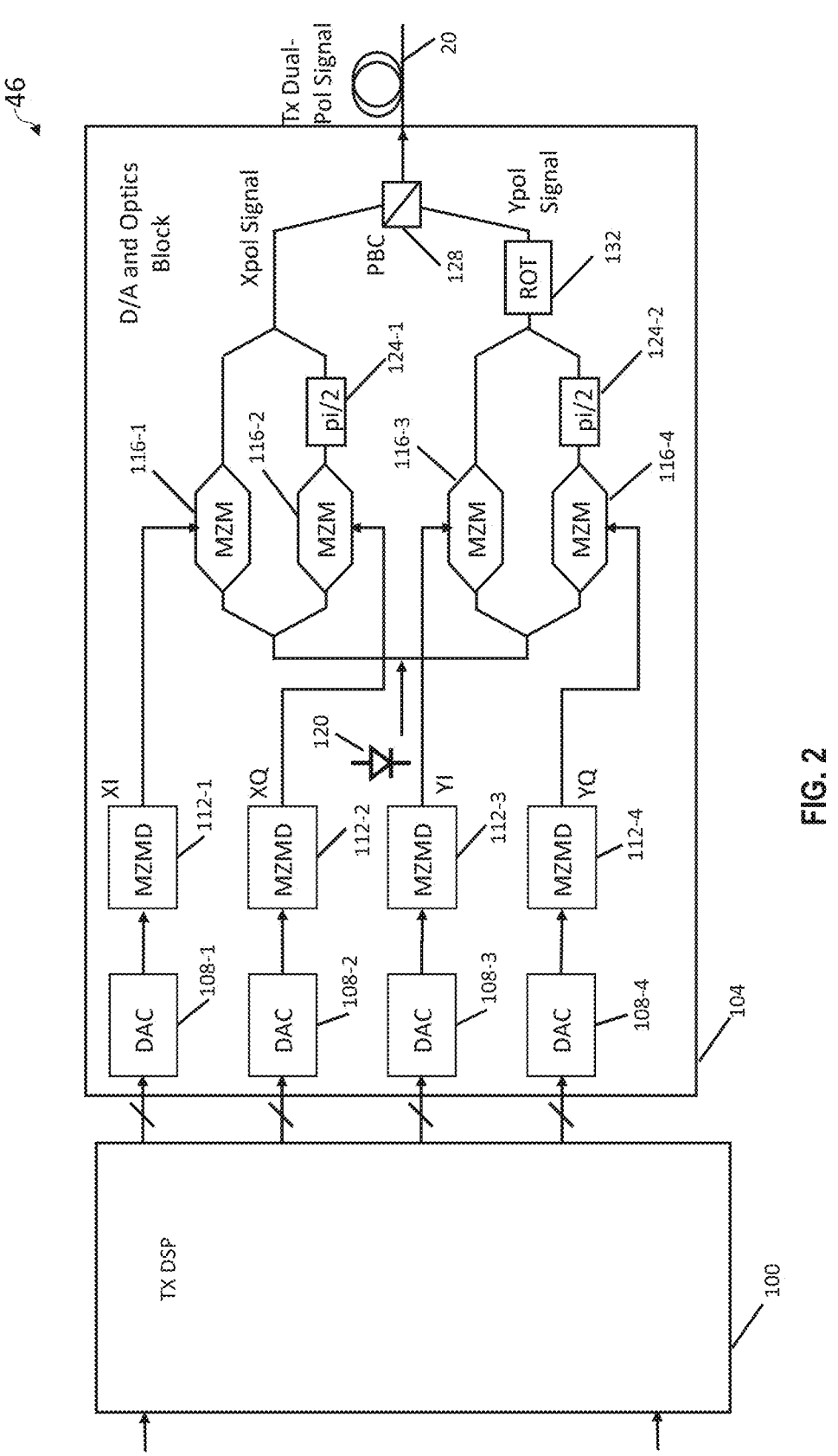
FIG. 2 is a block diagram showing an exemplary embodiment of a primary node transmitter constructed in accordance with the present disclosure.

Referring now to FIG. 2, shown therein is a diagram of an exemplary implementation of the transmitter module 46 constructed in accordance with the present disclosure. The transmitter module 46 generally includes a transmitter DSP 100 and a D/A and optics block 104. In one implementation, each input to the transmitter DSP 100, such as the inputs to FEC encoders 142 described below (see FIG. 3), receives user data.

The D/A and optics block 104 may comprise one or more digital-to-analog conversion circuits 108, such as a first DAC circuit 108-1, a second DAC circuit 108-2, a third DAC circuit 108-3, and a fourth DAC circuit 108-4 (which may be referred to herein simply as DAC circuits 108). The D/A and optics block 104 may include driver circuits 112, such as a first driver circuit 112-1, a second driver circuit 112-2, a third driver circuit 112-3, and a fourth driver circuit 112-4. The D/A and optics block 104 may include modulators 116, such as a first modulator 116-1, a second modulator 116-2, a third modulator 116-3, and a fourth modulator 116-4. The D/A and optics block 104 may comprise a laser 120. The D/A and optics block 104 may comprise one or more phase shifter 124, such as a first phase shifter 124-1 and a second phase shifter 124-2. The D/A and optics block 104 may comprise a polarization beam combiner 128. The D/A and optics block 104 may comprise a polarization rotator 132.

In one implementation, the transmitter DSP 100 may supply a plurality of outputs to the D/A and optics block 104 including to the first, second, third, and fourth digital-to-analog conversion (DAC) circuits 108-1 to 108-4, which may convert a digital signal received from the transmitter DSP 100 into corresponding analog signals. The first, second, third, and fourth driver circuits 112-1 to 112-4 of the D/A and optics block 104 may receive the analog signals from the first, second, third, and fourth DAC circuits 108-1 to 108-4 and adjust the voltages or other characteristics thereof to provide drive signals to a corresponding one of the modulators 116-1 to 116-4. The modulators 116 are configured to encode data into the optical signal.

In one implementation, the modulators 116-1 to 116-4 of the D/A and optics block 104 may be, for example, a Mach-Zehnder modulator (MZM) that modulates the phase and/or amplitude of the light output from an optical source such as laser 120. As further shown in FIG. 2, light output from the laser 120 is split such that a first portion of the light is supplied to a first MZM pairing, including first and second MZMs 116-1 and 116-2, and a second portion of the light is supplied to a second MZM pairing, including third and fourth MZMs 116-3 and 116-4. The first portion of the light is split further into third and fourth portions, such that the third portion is modulated by the first MZM 116-1 to provide an in-phase (I) component of an X (or TE) polarization component of a modulated optical signal, and the fourth portion is modulated by the second MZM 116-2 and fed to the first phase shifter 124-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by the third MZM 116-3 to provide an I component of a Y (or TM) polarization component of the modulated optical signal, and the sixth portion is modulated by the fourth MZM 116-4 and fed to the second phase shifter 124-2 to shift the phase of such light by 90 degrees to provide a Q component of the Y polarization component of the modulated optical signal.

The optical outputs of the first and second MZMs 116-1 and 116-2 are combined to provide an X polarized optical signal including I and Q components and are fed to the polarization beam combiner 128. In addition, the outputs of the third and fourth MZMs 116-3 and 116-4 are combined to provide an optical signal that is fed to the polarization rotator 132, that rotates the polarization of such optical signal to provide a modulated optical signal having a Y (or TM) polarization. The Y polarized modulated optical signal also is provided to the polarization beam combiner 128, which combines the X and Y polarized modulated optical signals to provide a polarization multiplexed ("dual-pol") modulated optical signal onto an optical fiber, for example the first optical fiber link 24-1, which may be included as a segment of optical fiber in the optical fiber submarine cable 20.

The polarization multiplexed optical signal output from the D/A and optics block 104 includes the subcarriers SC0-SC7 described below, such that each subcarrier has X and Y polarization components and I and Q components. Moreover, at least one subcarrier of the subcarriers SC0-SC7 of the polarization multiplexed optical signal output from the D/A and optics block 104 may further include the test subcarrier 182 and an optical tone 180 having an initial phase described in more detail below with respect to FIGS. 4A-4B.

It will be understood that fewer or more components may be included in the transmitter module 46.

Figure 3:
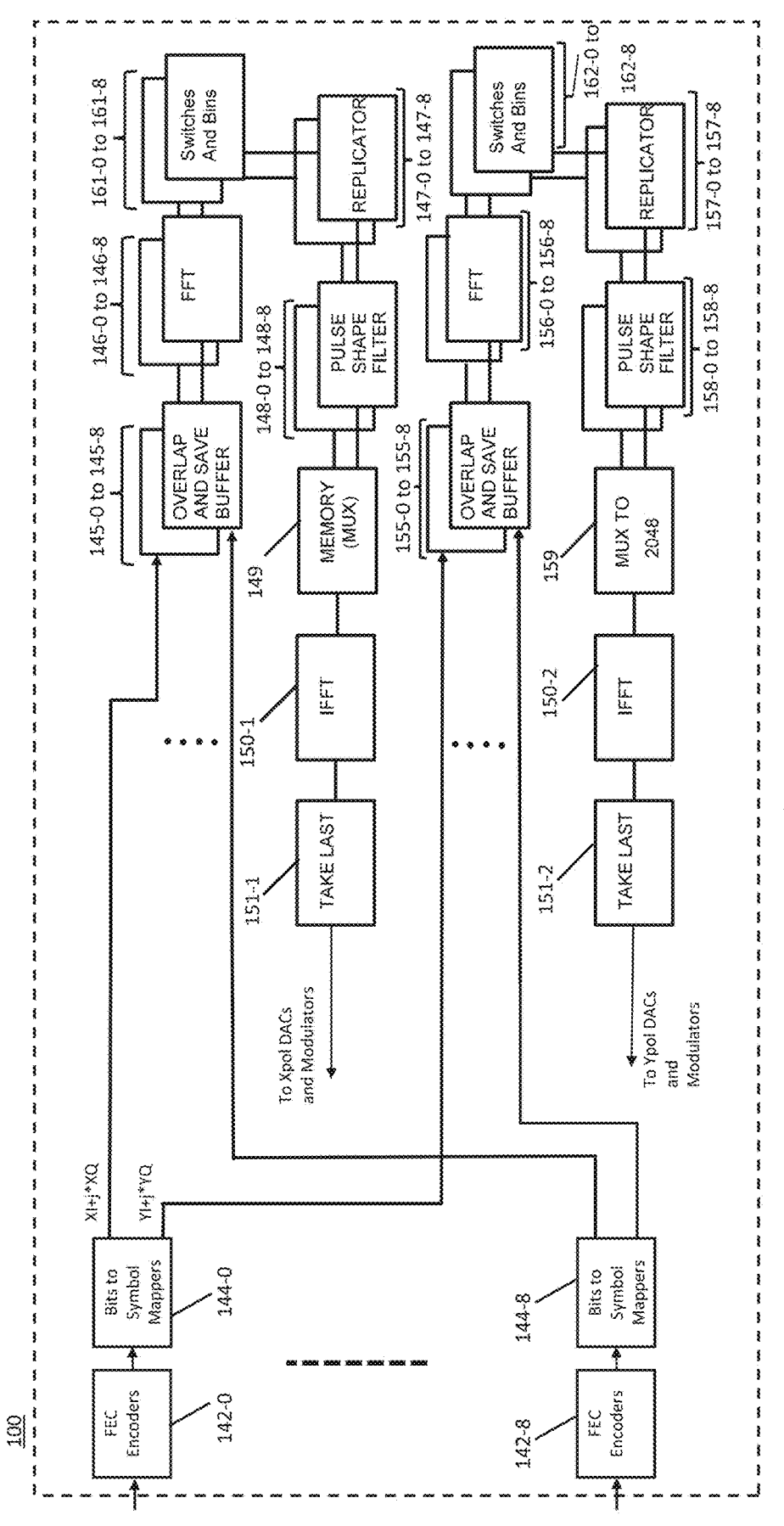
FIG. 3 is a block diagram showing an exemplary embodiment of a primary node transmitter digital signal processor (DSP) constructed in accordance with the present disclosure.

Referring now to FIG. 3, shown therein is a diagram of an exemplary embodiment of the transmitter DSP 100 of FIG. 2 shown in greater detail and constructed in accordance with the present disclosure. The transmitter DSP 100 may include a plurality of FEC encoders 142, such as first through eighth FEC encoders 142-0 to 142-8 (collectively referred to herein as "FEC encoders 142"). The FEC encoders 142 carry out forward error correction coding on a corresponding one of the switch outputs, such as, by adding parity bits to the received data. The FEC encoders 142 may also provide timing skew between the subcarriers to correct for skew induced by link between the primary node 14 and the secondary node 30. In addition, the FEC encoders 142 may interleave the received data.

Each of the FEC encoders 142 provides an output to a corresponding one of a plurality of bits-to-symbol circuits 144-0 to 144-8 (collectively referred to herein as "bits-to-symbol circuits 144"). Each of the bits-to-symbol circuits 144 may map the encoded bits to symbols on a complex plane. For example, bits-to-symbol circuits 144 may map four bits to a symbol in a dual-polarization QPSK constellation. Each of bits-to-symbol circuits 144 provides first symbols, having the complex representation $XI+j*XQ$, associated with a respective one of the switch outputs, such as D-0, to DSP portion 143. Data indicative of such first symbols is carried by the X polarization component of each subcarrier SC0-SC7.

Each of the bits-to-symbol circuits 144 further may provide second symbols having the complex representation YI+j*YQ. Data indicative of such second symbols, however, is carried by the Y polarization component of each subcarrier SC0 to SC7.

Such mapping, as carried out by the bits-to-symbol circuits 144 defines, in one example, a particular modulation format for each subcarrier. That is, such circuit may define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, 32, 64, 128 or 256, for example) format. In another example, one or more of the optical subcarriers may have a modulation format that is different than the modulation format of other optical subcarriers. That is, one of the optical subcarriers have a QPSK modulation format and another optical subcarrier has a different modulation format, such as 8-QAM or 16-QAM. In another example, one of the optical subcarriers has an 8-QAM modulation format and another optical subcarrier has a 16 QAM modulation format. Accordingly, although all the optical subcarriers may carry data at the same data and/or baud rate, consistent with an aspect of the present disclosure one or more of the optical subcarriers may carry data at a different data and/or baud rate than one or more of the other optical subcarriers. Moreover, modulation formats, baud rates, and data rates may be changed over time depending on capacity requirements, for example. Adjusting such parameters may be achieved, for example, by applying appropriate signals to bits-to-symbol mappers (e.g., symbol circuits 144) based on control information or data described herein and the communication of such data as further disclosed herein between nodes.

As further shown in FIG. 3, each of the first symbols output from each of the bits-to-symbol circuit 144 is supplied to a respective one of first overlap and save buffers 145-0 to 145-8 (collectively referred to herein as overlap and save buffers 145) that may buffer 256 symbols, for example. Each overlap and save buffer 145 may receive 128 of the first symbols or another number of such symbols at a time from a corresponding one of bits to symbol circuits 144. Thus, the overlap and save buffers 145 may combine 128 new symbols from bits to symbol circuits 144, with the previous 128 symbols received from the bits to symbol circuits 144.

Each overlap and save buffer 145 supplies an output, which is in the time domain, to a corresponding one of first fast Fourier Transform (FFT) circuits 146-0 to 146-8 (collectively referred to as "first FFTs 146"). In one example, the output includes 256 symbols or another number of symbols. Each of the first FFTs 146 converts the received symbols to the frequency domain using or based on, for example, a fast Fourier transform. Each of the first FFTs 146 may provide the frequency domain data to first switches and bins circuit blocks 161-0 to 161-8. The first switches and bins circuit blocks 161 include, for example, memories or registers, also referred to as frequency bins (FB) or points, that store frequency components associated with each subcarrier SC and the tone signal.

The first switches and bins circuit blocks 161 may be configured to supply the outputs of the first FFTs 146, i.e., frequency domain data FD, to corresponding frequency bins FB. Further processing of the contents of frequency bins FB by first replicator components 147 and other circuits in the transmitter DSP 100 result in drive signals supplied to the modulators 116, whereby, based on such drive signals, optical subcarriers are generated that correspond to the frequency bin groupings associated with that subcarrier and/or the optical tone.

In the example discussed above, the first switches and bins circuit blocks 161 supply frequency domain data FD0-0 to FD-n from the first FFT 146-0 to a respective one of the frequency bins FB0-0 to FB0-n for further processing, as described in greater detail below.

Each of the first replicator components 147-0 to 147-8 may replicate the contents of the frequency bins FB and store such contents (e.g., for T/2 based filtering of the subcarrier or optical tone) in a respective one of the plurality of replicator components. Such replication may increase the sample rate. In addition, the first replicator components 147-0 to 147-8 may arrange or align the contents of the frequency bins to fall within the bandwidths associated with first pulse shaped filter circuits 148-0 to 148-8 (collectively referred to herein as first pulse shaped filter circuits 148) described below.

Each first pulse shape filter circuit 148 may apply a pulse shaping filter to the data stored in the 512 frequency bins of a respective one of the plurality of first replicator components 147-0 to 147-8 to thereby provide a respective one of a plurality of filtered outputs, which are multiplexed and subject to an inverse FFT, as described below. The first pulse shape filter circuits 148 calculate the transitions between the symbols and the desired subcarrier spectrum so that the subcarriers can be packed together spectrally for transmission, e.g., with a close frequency separation. The first pulse shape filter circuits 148 also may be used to introduce timing skew between the subcarriers to correct for timing skew induced by links between nodes shown in FIG. 1, for example. A first multiplexer component 149 of the transmitter DSP 100, which may include a multiplexer circuit or memory, may receive the filtered outputs from the first pulse shape filter circuits 148, and multiplex or combine such outputs together to form an element vector. In one implementation, at least one of the first pulse shape filter circuits 148 may introduce a timing skew to separate the tone signal from the subcarriers such that the tone signal is separated from, and thus less likely to interfere with, the subcarriers.

Next, a first IFFT circuit 150-1 of the transmitter DSP 100 may receive the element vector and provide a corresponding time domain signal or data based on an inverse fast Fourier transform (IFFT). In one example, the time domain signal may have a rate of 64 GSample/s. A first take last buffer or memory circuit 151-1 of the transmitter DSP 100, for example, may select the last 1024 samples, or another number of samples, from an output of the first IFFT circuit 150-1 and supply the samples to the DAC circuits 108-1 and 108-2 (see FIG. 2) at 64 Gsample/s, for example. As noted above, the first DAC circuit 108-1 is associated with the in-phase (I) component of the X pol signal, and the second DAC circuit 108-2 is associated with the quadrature (Q) component of the Y pol signal. Accordingly, consistent with the complex representation XI+jXQ, the first DAC circuit 108-1 receives values associated with XI and the second DAC circuit 108-2 receives values associated with jXQ. As indicated by FIG. 2, based on these inputs, the first and second DAC circuits 108-1 and 108-2 provide analog outputs to the first and second MZMD 112-1 and MZMD 112-2, respectively, as discussed above.

As further shown in FIG. 3, each of the bits-to-symbol circuits 144 outputs a corresponding one of symbols indicative of data carried by the Y polarization component of the polarization multiplexed modulated optical signal output on optical fiber submarine cable 20. As further noted above, these symbols may have the complex representation YI+j*YQ. Each such symbol may be processed by a respective one of second overlap and save buffers 155-0 to 155-8 (collectively referred to herein as overlap and save buffers 155), a respective one of second FFT circuits 156-0 to 156-8 (collectively referred to as "second FFTs 156"), a respective one of second switches and bins components 162-0 to 162-8, a respective one of second replicator components 157-0 to 157-8, second pulse shape filter circuits 158-0 to 158-8, second multiplexer 159, second IFFT 150-2, and second take last buffer or memory circuit 151-2, to provide processed symbols having the representation YI+j*YQ in a manner similar to or the same as that discussed above in generating processed symbols XI+j*XQ output from the first take last circuit 151-1. In addition, symbol components YI and YQ are provided to third DAC circuit 108-3 and fourth DAC circuit 108-4 (FIG. 2), respectively. Based on these inputs, the third and fourth DAC circuits 108-3 and 108-4 provide analog outputs to the third MZMD 112-3 and the fourth MZMD 112-4, respectively, as discussed above.

While FIG. 3 shows the transmitter DSP 100 as including a particular number and arrangement of functional components, in some implementations, the transmitter DSP 100 may include additional functional components, fewer functional components, different functional components, or differently arranged functional components. In addition, typically the number of first overlap and save buffers 145, first FFT 146, first replicator components 147, and first pulse shape filter circuits 148 associated with the X component may be equal to the number of switch outputs, and the number of such circuits associated with the Y component may also be equal to the number of switch outputs. However, in other examples, the number of switch outputs may be different from the number of these circuits.

As noted above, based on the outputs of the first, second, third, and fourth MZMDs 112-1 to 112-4, a plurality of optical subcarriers SC0 to SC7 may be output onto optical fiber submarine cable 20 (FIG. 2), which is optically coupled to the primary node 14.

Consistent with an aspect of the present disclosure, the number of subcarriers transmitted from the primary node 14 to the secondary node 30 may vary over time based, for example, on capacity requirements at the primary node 14 and the secondary node 30. For example, if less downstream capacity is required initially at one or more of the secondary nodes 30, transmitter module 46 in primary node 14 may be configured to output fewer optical subcarriers. On the other hand, if further capacity is required later, transmitter module 46 may provide more optical subcarriers.

In addition, if based on changing capacity requirements, a particular secondary node 30 needs to be adjusted, for example, the output capacity of the particular secondary node 30 may be increased or decreased by, in a corresponding manner, increasing or decreasing the number of optical subcarriers output from the particular secondary node 30.

As noted above, by storing and subsequently processing zeros (0s) or other predetermined values in frequency bin FB groupings associated with a given subcarrier SC, that subcarrier may be removed or eliminated. To add or reinstate such subcarrier, frequency domain data output from the first FFTs 146 may be stored in frequency bins FB and subsequently processed to provide the corresponding subcarrier. Thus, optical subcarriers may be selectively added or removed from the optical outputs of the transmitter module

46 of the primary node 14, and the transmitter module 48 of the secondary node 30, such that the number of optical subcarriers output from the transmitter modules 46 may be varied, as desired.

In the above example, zeros (0s) or other predetermined values are stored in selected frequency bins FBs to prevent transmission of a particular optical subcarrier SC. Such zeroes or values may instead, be provided, for example, in a manner similar to that described above, at the outputs of corresponding ones of the first replicator components 147 or stored in corresponding locations in the first multiplexer component 149. Alternatively, the zeroes or values noted above may be provided, for example, in a manner similar to that described above, at corresponding outputs of the first pulse shape filter circuits 148.

In a further example, a corresponding one of first pulse shape filter circuits 148 may selectively generate zeroes or predetermined values that, when further processed, also cause one or more optical subcarriers SC to be omitted from the optical signal output from either the transmitter module 46 or the transmitter module 48. In particular, first pulse shape filter circuits 148 may include groups of multiplier circuits M. Multiplier circuits M constitutes part of a corresponding butterfly filter. In addition, each multiplier circuit grouping is associated with a corresponding one of optical subcarriers SC.

Each multiplier circuit M receives a corresponding one of output groupings RD from the first replicator components 147. In order to remove or eliminate one of optical subcarriers SC, multiplier circuits M receiving the outputs within a particular grouping associated with that optical subcarrier multiply such outputs by zero (0), such that each multiplier M within that group generates a product equal to zero (0). The zero products then are subject to further processing similar to that described above to provide drive signals to the modulators 116 that result in a corresponding optical subcarrier SC being omitted from the optical signal output from the transmitter module 46.

On the other hand, in order to provide an optical subcarrier SC, each of the multiplier circuits M within a particular groping may multiply a corresponding one of replicator outputs RD by a respective one of coefficients C, which results in at least some non-zero products being output. Based on the products output from the corresponding multiplier grouping, drive signals are provided to the modulators 116 to output the desired optical subcarrier SC from the transmitter module 46.

Accordingly, for example, in order to block or eliminate a second optical subcarrier SC1 (e.g., to "turn off" SC1), each of multiplier circuits M (associated with the second optical subcarrier SC1) multiplies a respective one of replicator outputs RD by zero (0). Each such multiplier circuit, therefore, provides a product equal to zero, which is further processed, as noted above, such that resulting drive signals cause the modulators 116 to provide an optical signal output without the second optical subcarrier SC1. In order to reinstate the second optical subcarrier SC1, multiplier circuits M multiply a corresponding one of appropriate coefficients C by a respective one of replicator outputs RD to provide products, at least some of which are non-zero. Based on these products, as noted above, modulator drive signals are generated that result in the second optical subcarrier SC1 being output.

The above examples are described in connection with generating or removing the X component of an optical subcarrier SC. The processes and circuitry described above is employed or included in the transmitter DSP 100 and optical circuitry used to generate the Y component of the optical subcarrier to be blocked. For example, second switches and bins circuit blocks 162-0 to 162-8, have a similar structure and operate in a similar manner as the first switches and bins circuit blocks 161 described above to provide zeroes or frequency domain data as the case may be to selectively block the Y component of one or more optical subcarriers SC. Alternatively, multiplier circuits, like those described above may be provided to supply zero products output from selected second pulse shape filters 158 in order to block the Y component of a particular optical subcarrier or, if non-zero coefficients are provided to the multiplier circuits instead, generate the optical subcarrier.

Thus, the above examples illustrate mechanisms by which optical subcarriers SC may be selectively blocked from or added to the optical signal output from the transmitter module 46. Since, as discussed below, DSPs and optical circuitry provided in the secondary node 30 transmitter module 48 are similar to that of primary node 14 transmitter module 46, the processes and circuitry described above is provided, for example, in the secondary node 30 transmitter module 48 to selectively add and remove optical subcarriers SC from the outputs of the secondary node 30 transmitter modules 48.

As described above in more detail, the transmitter module 46 may thus include an optical tone outside the bandwidth of the optical subcarriers into the optical signal transmitted from the primary node 14. The optical tone, therefore, has an initial frequency, an initial power, and an initial phase that is known at the time the optical signal is transmitted. Additionally, the optical tone may be associated with an initial time at which the optical tone is first transmitted. In some embodiments, the optical tone is not modulated with any data. Similarly, a particular one of the optical subcarriers SC0-SC7 may include the test subcarrier 182 modulated with a repeated data pattern (described below in more detail).

In one implementation, the optical tone is modulated. In some embodiments, the modulated optical tone may include data, for example, tone signal initial properties such as the initial frequency, initial power, and initial phase known at the time the optical signal is transmitted. In this way, in some embodiments, the secondary node 30 may receive information regarding the primary node 14.

Optical signals including optical subcarriers SC0 to SC7 and the test subcarrier and an optical tone reflection may be provided from the secondary node 30 to the primary node 14 in FIG. 1. An example of the coherent receiver 50 in the primary node 14 will be described below with reference to FIG. 7.

Figure 4A:
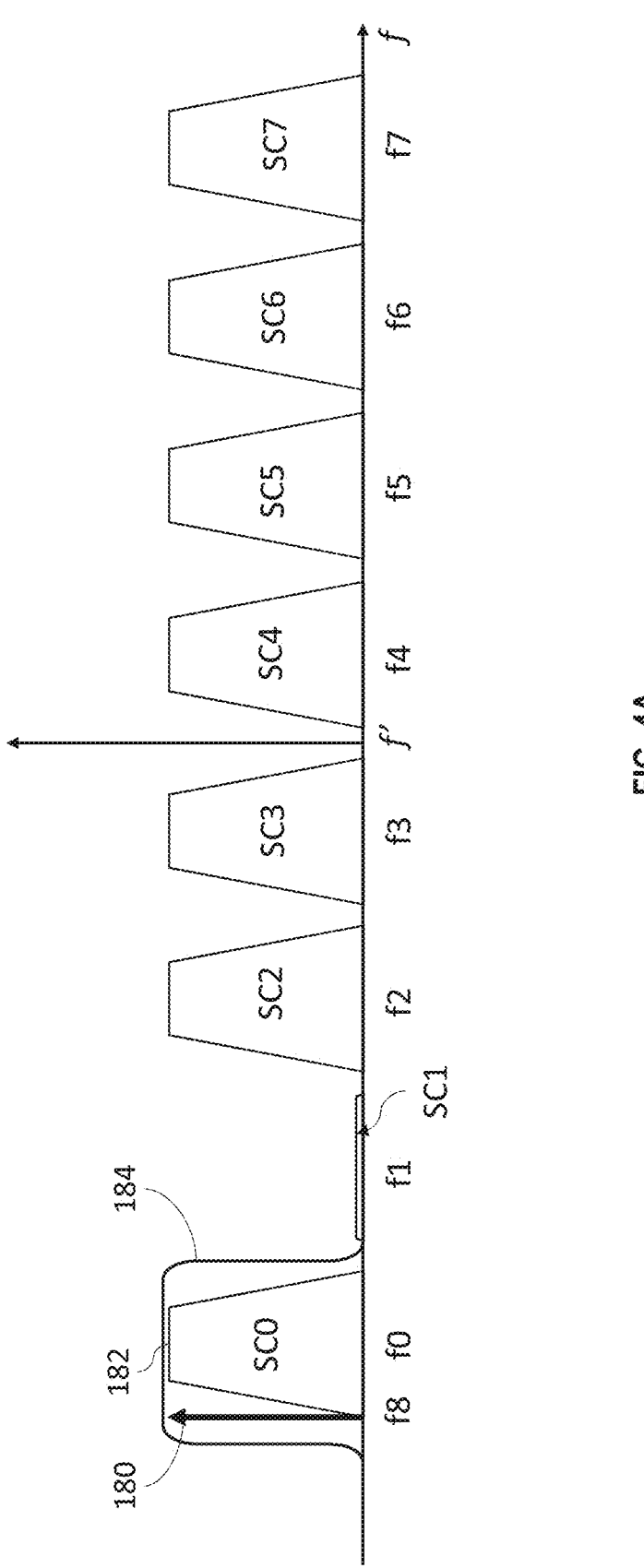
FIG. 4A is an example of a spectral plot showing optical subcarriers in accordance with the present disclosure.

Referring now to FIG. 4A, shown therein is a diagram of an exemplary embodiment of a plurality of subcarriers, SC0 to SC7 that may be output by the transmitter module 46 of the transceiver module 18 of the primary node 14 (and/or of the transmitter module 48 of the transceiver module 42 of the secondary node 30) consistent with an aspect of the present disclosure. Each of the subcarriers SC0 to SC7 may have a corresponding one of a plurality of frequencies f0 to f7. In addition, one or more of subcarriers SC0 to SC7 may be a Nyquist subcarrier. A Nyquist subcarrier is a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier SC may have an optical spectral bandwidth that is at least equal to the Nyquist frequency, as determined by the baud rate of such subcarrier. For example, each of the subcarriers SC0-SC7 may have a bandwidth of, for example, about 8 GHz to about 25 GHz.

As discussed in greater detail above, optical subcarriers SC0 to SC7 are generated by modulating light output from a laser. The frequency of such laser output light is f and is typically a center frequency such that half the subcarrier subcarriers, e.g., f4 to f7, are above f and half the subcarrier frequencies, e.g., f0 to f3, are below f.

Further shown in FIG. 4A is the optical tone 180. The optical tone 180 may be generated, for example by one or more of the transmitter DSP 100 sending a signal to the DAC 108 to cause the driver circuits 112 (e.g., MZMD) to generate a signal corresponding to the optical tone 180 to be generated by the modulators 116 (e.g., MZMs). In one implementation, the optical tone 180 is generated at a tone frequency f8 outside the carrier bandwidth between f0-f7 as shown in FIG. 4A. It should be noted that while the optical tone 180 is shown at a frequency less than the carrier bandwidth, e.g., less than f0, in other embodiments, the optical tone 180 could be generated such that the optical tone 180 is at a tone frequency f8 outside the carrier bandwidth but greater than the frequency for SC7 at f7. The optical tone 180, as shown in FIG. 4A, has an initial frequency, initial power, and initial polarization that is known at the time the optical signal is transmitted.

In one implementation, the tone frequency f8 of the optical tone 180 is generated at a frequency more than 500 MHz outside the carrier bandwidth, e.g., at a frequency at least 500 MHz less than f0.

In one implementation, the optical tone 180 is one or more of a pulsed signal (e.g., a signal transmitted periodically in predetermined intervals), a static signal (e.g., a signal that is continuously transmitted or inserted into the optical signal), or a per pol signal (e.g., a signal consisting of only one polarization). In one implementation, the optical tone 180 is frequency hopping, e.g., sequential hopping or changing the wavelength in a predetermined sequence. When the optical tone 180 is pulsed, the optical tone 180 may be included with the optical signal at a first instance of time and at a second instance of time such that the optical tone 180 pulsed at the second instance of time does not interfere with the optical tone 180 pulsed at the first instance of time. In one implementation, the duty cycle is about 100 ms or between 75 and 125 ms.

In one implementation, the optical tone 180 has a pulse width selected based on a desired spatial resolution. The pulse width may be, for example, 200 microseconds. In some embodiments, the optical tone 180 has a bandwidth of 1 GHz. In one implementation, the optical tone 180 may have a relatively narrow range of frequencies that may be amplitude modulated at a low frequency or may be unmodulated.

In one implementation, as shown in FIG. 4A, the test subcarrier 182 may be a first optical subcarrier SC0 and the optical tone 180 may be adjacent to the first optical subcarrier SC0. Further, shown is a filter spectrum 184 which may be a portion of the optical signal which includes the test subcarrier 182 (here, the first subcarrier SC0) and the optical tone 180. The filter spectrum 184 may include the optical tone 180 and the test subcarrier 182 tuned such that optical tone 180 and the test subcarrier 182 are aligned in wavelength to the tuned wavelength of the fiber Bragg grating 39 of the high loss loopback 38, that is, a grating bandwidth of the fiber Bragg grating 39 correlates to and/or aligns to the test frequency band of the filter spectrum 184 and/or pulse 204 (described below in detail). In one implementation, the test subcarrier 182 may be any of the optical subcarriers SC0-SC7, however, the test subcarrier 182 preferably aligns to the fiber Bragg grating 39 of the high loss loopback 38. In one implementation, the test subcarrier 182 may be on an edge of the optical subcarriers SC, which in this case would be the first optical subcarrier SC0 or the eighth optical subcarrier SC7. In one implementation, the test subcarrier 182 may be aligned to the eighth optical subcarrier SC7.

In one implementation, when the test subcarrier 182 is provided in the optical signal, a next optical subcarrier adjacent to the test subcarrier 182 may be removed, e.g., zeroed out or provided with 0's as detailed above. For example, as shown in FIG. 4A, when the test subcarrier 182 is provided in the optical signal as the first optical subcarrier SC0, the adjacent optical subcarrier (i.e., the second optical subcarrier SC1) is removed, or zeroed out. That is, data is not transmitted within the adjacent optical subcarrier SC1.

Figure 4B:
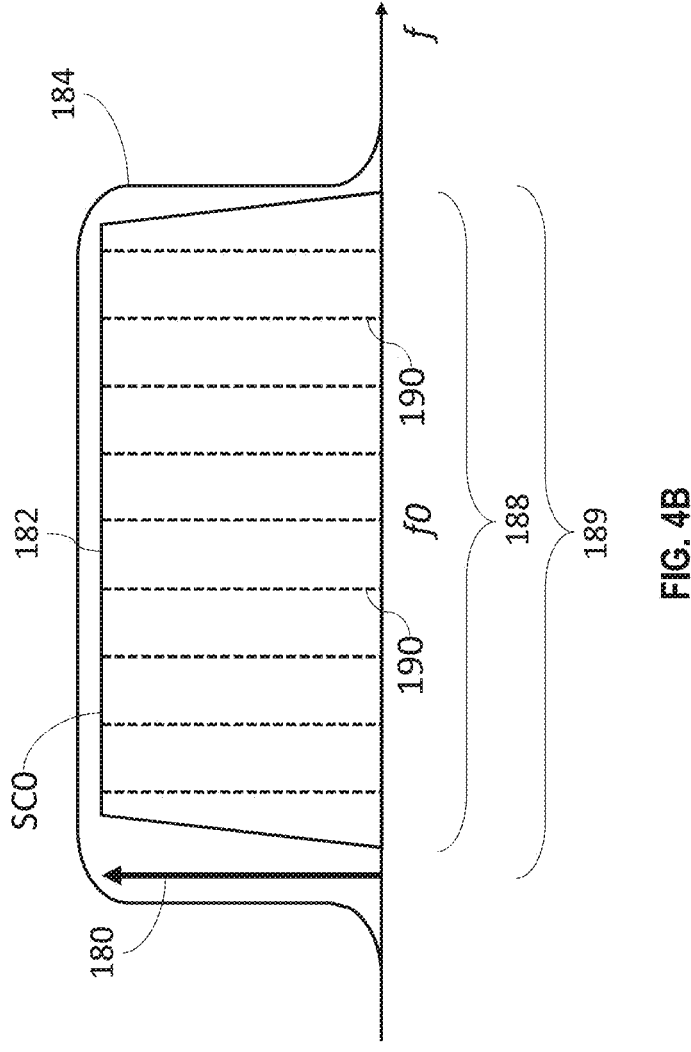
FIG. 4B is a diagram of an exemplary embodiment of the filter spectrum having the test subcarrier as may be output in the optical signal consistent with an aspect of the present disclosure.

Referring now to FIG. 4B, shown therein is a diagram of an exemplary embodiment of the filter spectrum 184 having the test subcarrier 182 (here, the first subcarrier SC0) as may be output in the optical signal by the transmitter module 46 of the transceiver module 18 consistent with an aspect of the present disclosure. As shown, the test subcarrier 182 has a test frequency band 188 and the repeated data pattern modulated into the test subcarrier 182 may result in a plurality of comb lines 190 (hereinafter comb lines 190) as shown in the test subcarrier 182 of FIG. 4B. Each comb line 190 of the plurality of comb lines 190 may have a particular phase relative to the optical tone 180. In one implementation, the test frequency band 188 may be 12 GHz. In one implementation, when the test frequency band 188 further includes the optical tone 180 such that the test frequency band 188 is larger than a bandwidth of the test subcarrier 182, the test frequency band 188 may be described as a pulse bandwidth 189.

Figure 5A:
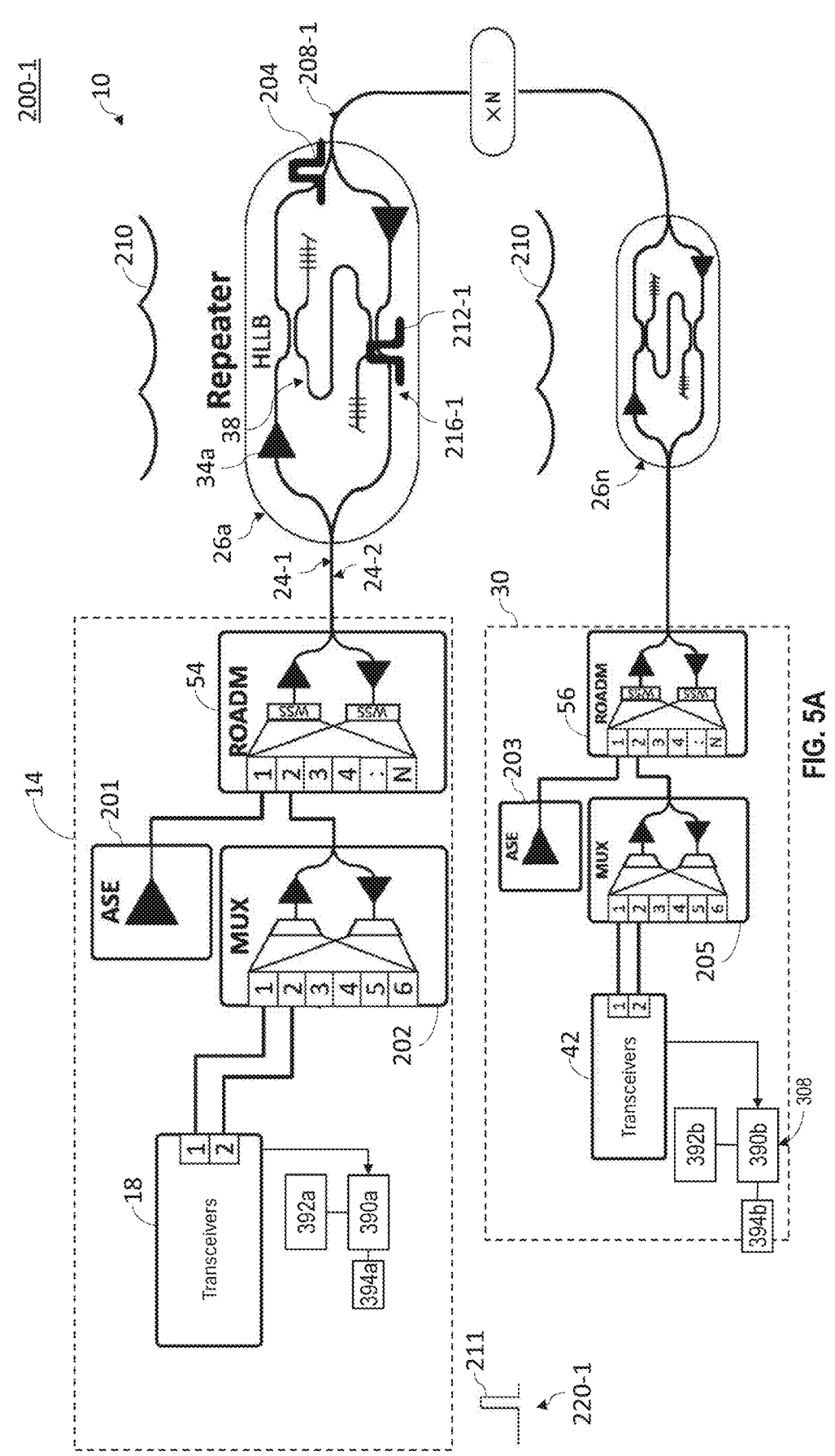
FIGS. 5A-5C depict an exemplary embodiment of a location of a pulse and pulse reflection within the optical network of FIG. 1 at varying instances in time.
Figure 5B:
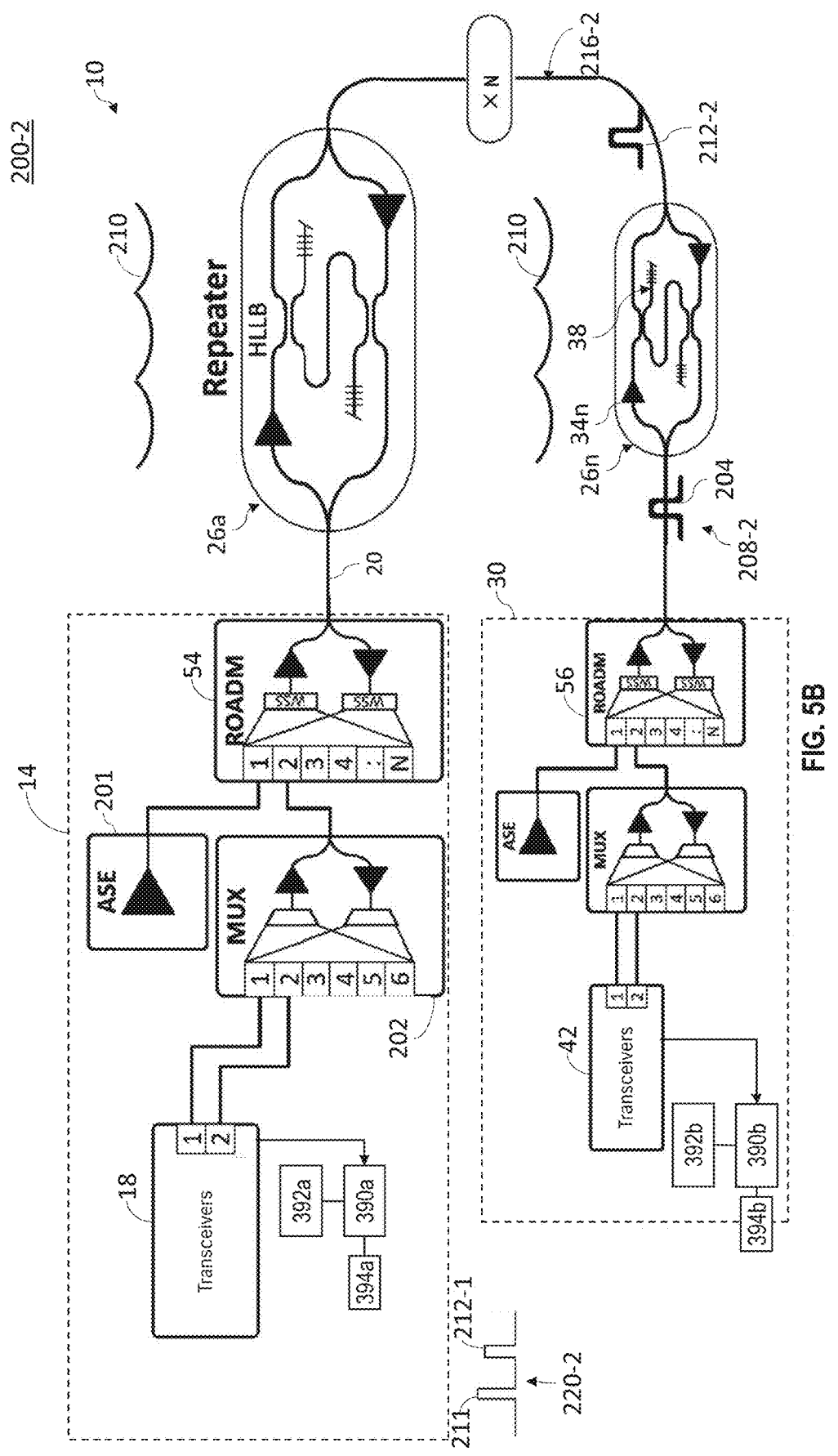
Figure 5C:
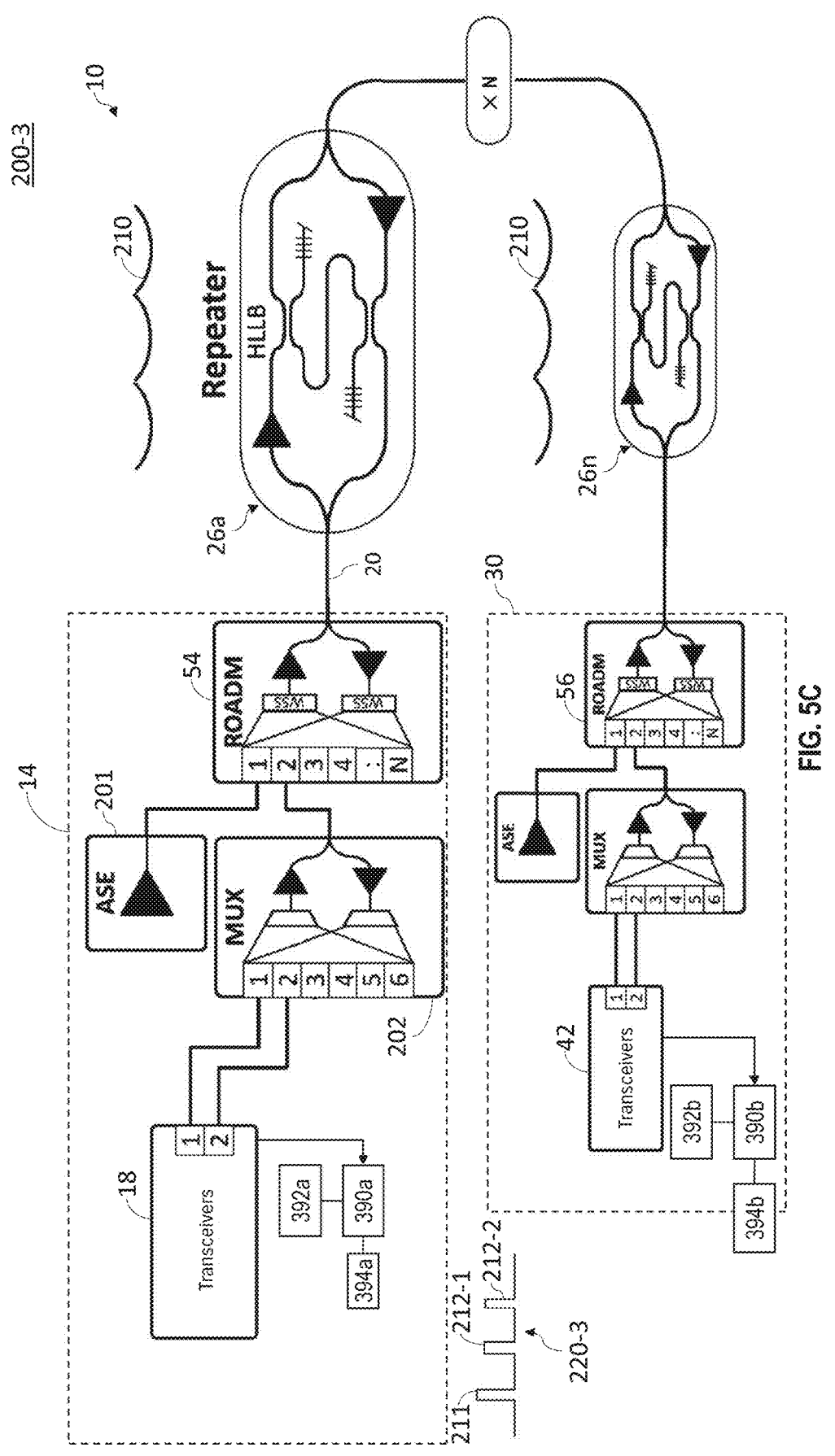

Referring now to FIGS. 5A-5C in combination, shown therein is the optical communication system 10 of FIG. 1 at different instances of time 200 depicting one or more of a pulse 204, an HLLB spectrum location 208, a Pulse reflection 212, an HLLB spectrum reflection location 216, and a time-series graph 220 (shown as time-series graph 220-1 at a first instance of time 200-1 in FIG. 5A) of the pulse reflection 212. The pulse 204 may be a particular instance of the filter spectrum 184 having the test subcarrier 182 and the optical tone 180 as described in detail above.

Referring now to FIG. 5A, shown therein is the optical communication system 10 of FIG. 1 at a first instance of time 200-1. As shown, at the first instance of time 200-1, the pulse 204, after having traveled along the first optical fiber link 24-1, passing through the high loss loopback 38 of a first optical repeater 26a, at a first HLLB spectrum location 208-1, generates a first Pulse reflection 212-1 (shown at a first HLLB spectrum reflection location 216-1) traveling upstream towards the primary node 14 along the second optical fiber link 24-2. The primary node 14 may further include a number of optical components, such as a light source 201, a multiplexer/demultiplexer 202, and the ROADM 54. In this way, the pulse 204 traveling between the primary node 14 and the first optical repeater 26a may experience dispersion, for example, as caused by an environmental disturbance 210. The dispersion may affect a phase of each comb line 190 in the test subcarrier 182 and the optical tone 180 of the pulse 204. The dispersion may further affect the phase of each comb line 190 in the test subcarrier 182 and the optical tone 180 of the first pulse reflection 212-1 as the first pulse reflection 212-1 passes through the second optical fiber link 24-2 traveling upstream from the first optical repeater 26a and the primary node 14.

In one implementation, the first Pulse reflection 212-1 is received by the coherent receiver 50 (shown in FIG. 7) and processed by a receiver DSP 308 (FIG. 7) and stored, as discussed below in more detail. A representation of the first pulse reflection 212-1 and a local pulse reflection 211 (e.g., the test subcarrier 182 and the optical tone 180 as transmitted from the primary node 14) is shown in the time-series graph 220-1 in FIG. 5A.

In one implementation, the primary node 14 further includes a first processor 390a in communication with the transceiver module 18 and a first memory 392a. The first memory 392a may be a non-transitory, processor-readable memory which may store processor-executable instructions and/or data, such as in a database, or other computer readable structure, for example. In one implementation, the first processor 390a is in communication with and may receive from the transceiver module 18 of the primary node 14 an indication of a phase of each of the plurality of comb lines 190 of the first Pulse reflection 212-1, for example, relative to the optical tone 180 of the pulse 204. The first processor 390a may store the indication of a phase of each of the plurality of comb lines 190 relative to the optical tone 180 of the pulse 204 in the first memory 392a. In one implementation, the first processor 390a and the first memory 392a are integrated into, or otherwise a part of, the receiver DSP 308 of the primary node 14 as discussed below. In one implementation, the primary node 14 and/or the secondary node 30 may include a network element 394, such as a first network element 394a in the primary node 14 and/or a second network element 394b in the secondary node 30, for example (which may be referred to collectively as network element 394).

In one implementation, the first memory 392a stores the processor-executable instructions that when executed by the first processor 390a, causes the first processor 390a to communicate and/or exchange data with one or more of the transceiver modules 18 and/or one or more component of the transceiver module 18 of the first node 14 and to further implement the functions described below in more detail.

In one implementation, the first processor 390a of the receiver DSP 308 receives the first Pulse reflection 212-1 and, instead of demodulating the first Pulse reflection 212-1, uses the optical tone 180 as a reference to detect a phase of each of the plurality of comb lines 190. In this way, a phase sensitive measurement of the first Pulse reflection 212-1 may be determined without an ultra-low linewidth laser. However, instead of measuring a total phase with the phase sensitive measurement, a total dispersion may be determined by the first processor 390a.

In some implementations, the phase sensitive measurement and/or the total dispersion may be stored in a database or other computer readable structure in the first memory 392a, whereas in other embodiments, the phase sensitive measurement and/or the total dispersion may be stored in a data buffer or, in some embodiments, sent via a network element (e.g., the network element 394) to another processor, computer, or server, for example.

In one implementation, the first processor 390a stores the phase sensitive measurement and/or the total dispersion with one or more additional spectrum reflection information. The one or more spectrum reflection information may include, for example, a timestamp indicative of a time at which the coherent receiver 50 received the first pulse reflection 212-1, a time-delta indicative of a difference in time between a time at which the coherent receiver 50 received the first pulse reflection 212-1 and a time at which the transceiver module 18 transmitted the pulse 204, and/or a time at which the secondary transceiver 42 (discussed below) received the first Pulse reflection 212-1. The one or more additional spectrum reflection information may further include a distance and/or a particular one of the optical fiber links 24 determined as described below in relation to FIG. 6.

In some embodiments, the secondary node 30 includes the transmitter module 48 of the secondary transceiver 42 (constructed in accordance with the transmitter module 46 of the transceiver module 18 described above), a second processor 390b, a second memory 392b, and/or, optionally, a second network element 394b, each of which is similar to and operates in accordance with the same components, the first processor 390a, the first memory 392a and the first network element 394a, respectively, described above. In some embodiments, the first processor 390a in the primary node 14 may be in communication with the second processor 390b in the secondary node 30 to jointly process the phase sensitive measurement and/or the total dispersion and/or one or more additional spectrum reflection information in optical signals in both the upstream and the downstream directions. In this way, a precision and/or quality of the determined phase sensitive measurement and/or the total dispersion and/or the one or more additional spectrum reflection information may be improved to better locate environmental disturbances 210 on the optical communication system 10. The environmental disturbances 210 may include, for example, an earthquake, a temperature, a pressure, a wave, a tsunami, ground movement, and/or the like. The environmental disturbance 210 may include, for example, seismic pressures on the optical fiber link 24. The secondary node 30 may further include a number of optical components, such as a light source 203, a multiplexer/demultiplexer 205, and the ROADM 56.

Referring now to FIG. 5B, shown therein is the optical communication system 10 of FIG. 1 at a second instance of time 200-2. As shown, at the second instance of time 200-2, the pulse 204 has a second HLLB spectrum location 208-2 between the optical repeater 26n and the secondary node 30. At this second instance of time 200-2, the pulse 204 has already passed the high loss loopback 38 of the optical repeater 26n, resulting in a second Pulse reflection 212-2 heading upstream towards the primary node 14. At the second instance of time 200-2, the first Pulse reflection 212-1 has already been received by the coherent receiver 50 of the transceiver module 18 in the primary node 14 and the receiver DSP 308 has determined a phase sensitive measurement of the plurality of comb lines 190 of the first pulse reflection 212-1. A representation of the first pulse reflection 212-1 is shown in the time-series graph 220-2 in FIG. 5B.

Referring now to FIG. 5C, shown therein is the optical communication system 10 of FIG. 1 at a third instance of time 200-3. As shown, at the third instance of time 200-3, the pulse 204 has been received by the secondary node 30. At the third instance of time 200-3, the second Pulse reflection 212-2 has been received by the coherent receiver 50 of the transceiver module 18 of the primary node 14, as depicted in time-series graph 220-3. In one implementation, the receiver DSP 308 has determined the phase sensitive measurement and/or the total dispersion of the second Pulse reflection 212-2.

In one implementation, the first processor 390a of the primary node 14 is in communication with and may receive from the receiver DSP 308 an indication of the phase sensitive measurement and/or the total dispersion of the second Pulse reflection 212-2. The first processor 390a, in communication with the receiver DSP 308, determines the phase sensitive measurement of the second pulse reflection 212-2 and stores the phase sensitive measurement in the first memory 392a as described above in more detail.

In one implementation, the first processor 390a stores the phase sensitive measurement and/or the total dispersion with one or more additional spectrum reflection information, as described above. The time-delta may be, for example, a time difference between a time at which the coherent receiver 50 received the first pulse reflection 212-1 and any other pulse reflection 212 or may be a time difference between a time at which the coherent receiver 50 received a particular pulse reflection 212 and a subsequent pulse reflection 212. In each of the above cases, the first processor 390a of the primary node 14 can determine a time traveled by each pulse reflection 212 to determine a particular distance traveled by a particular pulse reflection 212 as described below in reference to FIG. 6. Receiving, by the coherent receiver 50 of the first node 14, the first pulse reflection 212-1 at the second instance of time and the second pulse reflection 212-2 at the third instance of time may be considered a stream of pulses separated in time where each pulse is a particular pulse reflection 212.

In one implementation, the first processor 390a may store the polarization with the one or more additional spectrum reflection information for the second pulse reflection 212-2 wherein the one or more additional tone reflection information may include a distance and/or a particular one of the optical fiber link 24 determined as described below in relation to FIG. 6.

In one implementation, the first processor 390a may store (such as in the nontransitory memory 392a) the phase sensitive measurement and/or the total dispersion with one or more additional spectrum reflection information for each pulse reflection 212 received for a particular pulse 204 sent. For example, the first processor 390a may store a first phase sensitive measurement and/or a first total dispersion with a first one or more additional spectrum reflection information for each pulse reflection 212 caused by each optical repeater 26a-n between the primary node 14 and the secondary node 30 of a first pulse 204, and the first processor 390a may store a second phase sensitive measurement and/or a second total dispersion with a second one or more additional spectrum reflection information for each pulse reflection 212 caused by each optical repeater 26a-n between the primary node 14 and the secondary node 30 of a second pulse 204.

In one implementation, a time between when the transceiver module 18 transmits the test subcarrier 182 and the optical tone 180 of the first pulse 204 and when the transceiver module 18 transmits the test subcarrier 182 and the optical tone 180 of the pulse 204 may be considered a duty cycle. The duty cycle may be determined, for example, based on an amount of time equal (or greater than) twice an optical signal transit time, or a time it takes for the optical signal sent from the primary node 14 to be received by the secondary node 30 and reflected back to the primary node 14. The duty cycle may be, for example, about 100 ms, depending on a distance between the primary node 14 and the secondary node 30. The duty cycle may be determined, for example, by testing the optical communication system 10 for the optical signal transit time and adding an offset to the optical signal transit time. In some implementations, the offset may be between about 1 ms to about 5 ms in order to ensure that each Pulse reflection 212 is associated with a particular pulse 204 that caused the particular Pulse reflection 212.

In one implementation, the first processor 390a is further in communication with the transmitter module 46 and, once the first processor 390a has stored the phase sensitive measurement and/or the total dispersion data with the one or more additional spectrum reflection information for a last pulse reflection 212, e.g., a pulse reflection 212 caused by the high loss loopback 38 optically disposed immediately prior to the secondary node 30, the first processor 390a may send a signal to the transmitter module 46 to cause the transmitter module 46 to send the test subcarrier 182 and the optical tone 180 of a second pulse 204b.

It should be understood that while only two pulse reflections 212 are described in relation to FIGS. 5A-5C, the number of HLLB spectrum reflections in the optical communication system 10 may be at least equal to one plus the number of optical repeaters 26a-n (having the high loss loopback 38) between the primary node 14 and the secondary node 30.

Additionally, while FIGS. 5A-5C illustrates only one pulse reflection 212 in the optical communication system 10 at each instance of time 200 for simplicity, any number of pulse reflections 212 may be present in the optical communication system 10 at each instance of time 200 based on a distance between the optical repeaters 26a-n. In one implementation, the number of pulse reflections 212 present in the optical communication system 10 at any instance of time 200 may be dependent on a number of the optical repeaters 26 present in the optical communication system 10 and a distance of each optical fiber link 24 between each of the optical repeaters 26a-n.

As shown in reference to FIGS. 5A-C, in this way, the primary node 14 can receive each pulse reflection 212 caused by the pulse 204 being reflected upstream at each optical repeater 26a-n by the high loss loopback 38.

Figure 6:
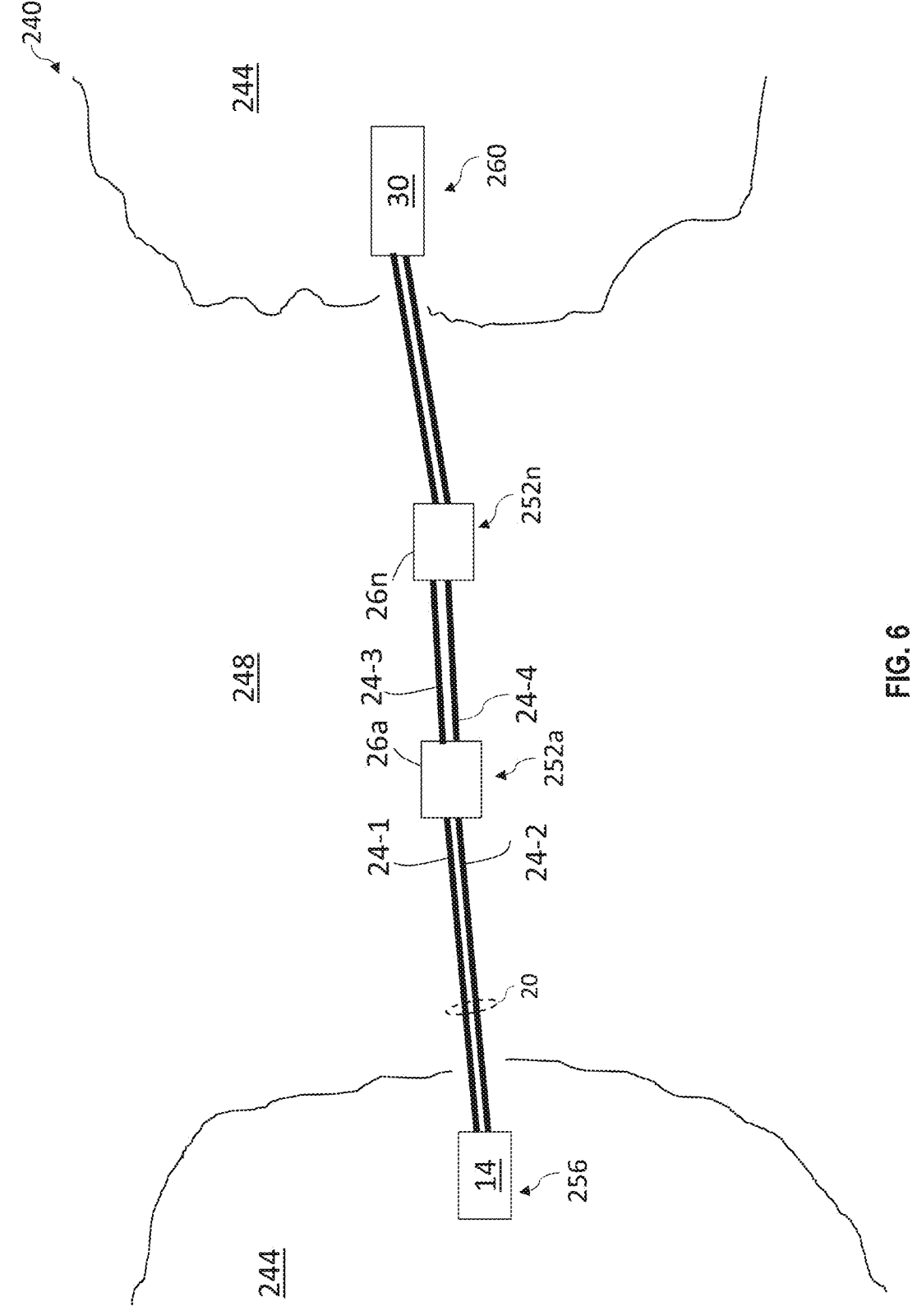
FIG. 6 is a diagram of an exemplary embodiment of a subsea optical communication system aspect of the optical communication system of FIG. 1 including one or more optical amplifier at a known geographic location.

Referring now to FIG. 6, shown therein is a diagram of an exemplary embodiment of a subsea optical communication system 240 constructed in accordance with the present disclosure. The subsea optical communication system 240 may be constructed similar to the optical communication system 10 of FIG. 1. The subsea optical communication system 240 illustrates the primary node 14 and the secondary node 30 being on land 244 while the optical repeaters 26, shown as the first optical repeater 26a and the optical repeater 26n, are illustrated as being submerged under water 248. Each optical repeater 26a-n is shown to have a known geographic location 252, e.g., a known location 252a for the first optical repeater 26a and a known location 252n for the optical repeater 26n. The known geographic location 252 can be expressed in latitude/longitude. Moreover, each node has a known location, e.g., the primary node 14 and the secondary node 30, have a known primary location 256 and a known secondary location 260, respectively. Thus, each optical fiber link 24 has a known length based on a distance between respective known locations.

Therefore, when the pulse 204 is transmitted downstream, i.e., from the primary node 14 towards the secondary node 30, thus generating the spectrum reflection at each of the optical repeaters 26, the primary node 14 can measure a duration between each instance of time 200 to determine a distance traveled for each pulse reflection 212. In this way, any change in phase for each of the plurality of comb lines 190 and between the pulse 204 and the pulse reflection 212 can be correlated to a particular distance travelled along the optical fiber links 24, and thus, to a particular one of the optical fiber links 24 over which the phase may have changed.

Figure 7:
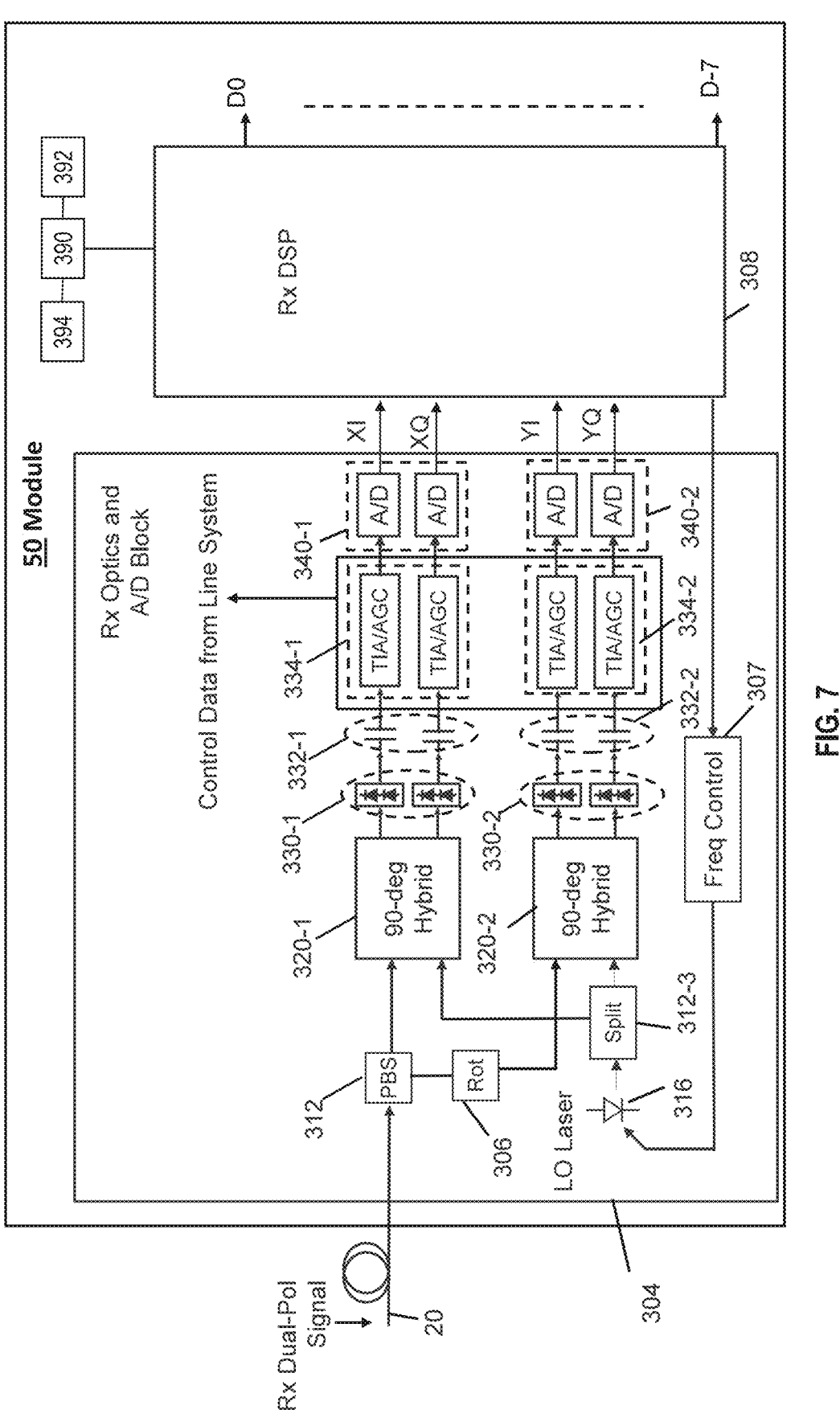
FIG. 7 is a diagram showing an exemplary embodiment of a secondary node receiver constructed in accordance with the present disclosure.

Referring now to FIG. 7, shown therein is the coherent receiver 50 of the primary node 14 including an Rx optics and A/D block 304, which, in conjunction with the receiver DSP 308, may carry out coherent detection. Rx optics and A/D block 304 may include a polarization beam splitter 312 (PBS) with first and second outputs, a local oscillator laser 316 (i.e., LO laser), 90 degree optical hybrids or hybrid mixers 320 (referred to generally as hybrid mixers 320 and individually as hybrid mixer 320) shown as a first hybrid mixer 320-1 and a second hybrid mixer 320-2, a first detector 330-1 and a second detector 330-2 (referred to generally as detectors 330 and individually as detector 330, each including either a single photodiode or balanced photodiode), a first AC coupling capacitor 332-1 and a second AC coupling capacitor 332-2, transimpedance amplifiers/automatic gain control circuits 334 (referred to as TIA/AGCs 334 and shown as a first TIA/AGC 334-1 and a second TIA/AGC 334-2, ADCs 340 shown as a first ADC 340-1 and a second ADC 340-2 (referred to generally as ADCs 340 and individually as ADC 340).

The polarization beam splitter 312 may include a polarization splitter that receives an input polarization multiplexed optical signal including the optical subcarriers SC0 to SC7 and the optical tone 180 carried along the optical fiber link 24, for example. The polarization beam splitter 312 may split the incoming optical signal into the two X and Y orthogonal polarization components. The Y component may be supplied to a polarization rotator 306 that rotates the polarization of the Y component to have the X polarization. Hybrid mixers 320 may combine the X and rotated Y polarization components with light from local oscillator laser 310, which, in one example, is a tunable laser. For example, the first hybrid mixer 320-1 may combine a first polarization signal (e.g., the component of the incoming optical signal having a first or X (TE) polarization output from a first PBS port with light from local oscillator laser 316, and the second hybrid mixer 320-2 may combine the rotated polarization signal (e.g., the component of the incoming optical signal having a second or Y (TM) polarization output from a second PBS port) with the light from local oscillator laser 316. In one example, the polarization rotator 306 may be provided at the PBS output to rotate Y component polarization to have the X polarization.

The detectors 330 may detect mixing products output from the hybrid mixers 320, to form corresponding voltage signals, which are subject to AC coupling by capacitors 332, as well as amplification and gain control by TIA/AGCs 334. The outputs of the TIA/AGCs 334 and the ADCs 340 may convert the voltage signals to digital samples. For example, two first detectors 330-1 (e.g., photodiodes) may detect the X polarization signals to form the corresponding voltage signals, and a corresponding two first ADCs 340-1 may convert the voltage signals to digital samples for the first polarization signals after amplification, gain control and AC coupling. Similarly, two second detectors 330-2 may detect the rotated Y polarization signals to form the corresponding voltage signals, and a corresponding two second ADCs 340-2 may convert the voltage signals to digital samples for the second polarization signals after amplification, gain control and AC coupling. The receiver DSP 308 may process the digital samples associated with the X and Y polarization components to output data associated with one or more subcarriers within a group of the subcarriers SC0 to SC7 encompassed by the bandwidth associated with the secondary node 30 housing the receiver DSP 308.

While FIG. 7 shows the coherent receiver 50 as including a particular number and arrangement of components, in some implementations, the coherent receiver 50 may include additional components, fewer components, different components, or differently arranged components. The number of detectors 330 and/or ADCs 340 may be selected to implement the coherent receiver 50 that is capable of receiving the optical signal. In some instances, one of the components illustrated in FIG. 7 may carry out a function described herein as being carry out by another one of the components illustrated in FIG. 8.

Figure 8:
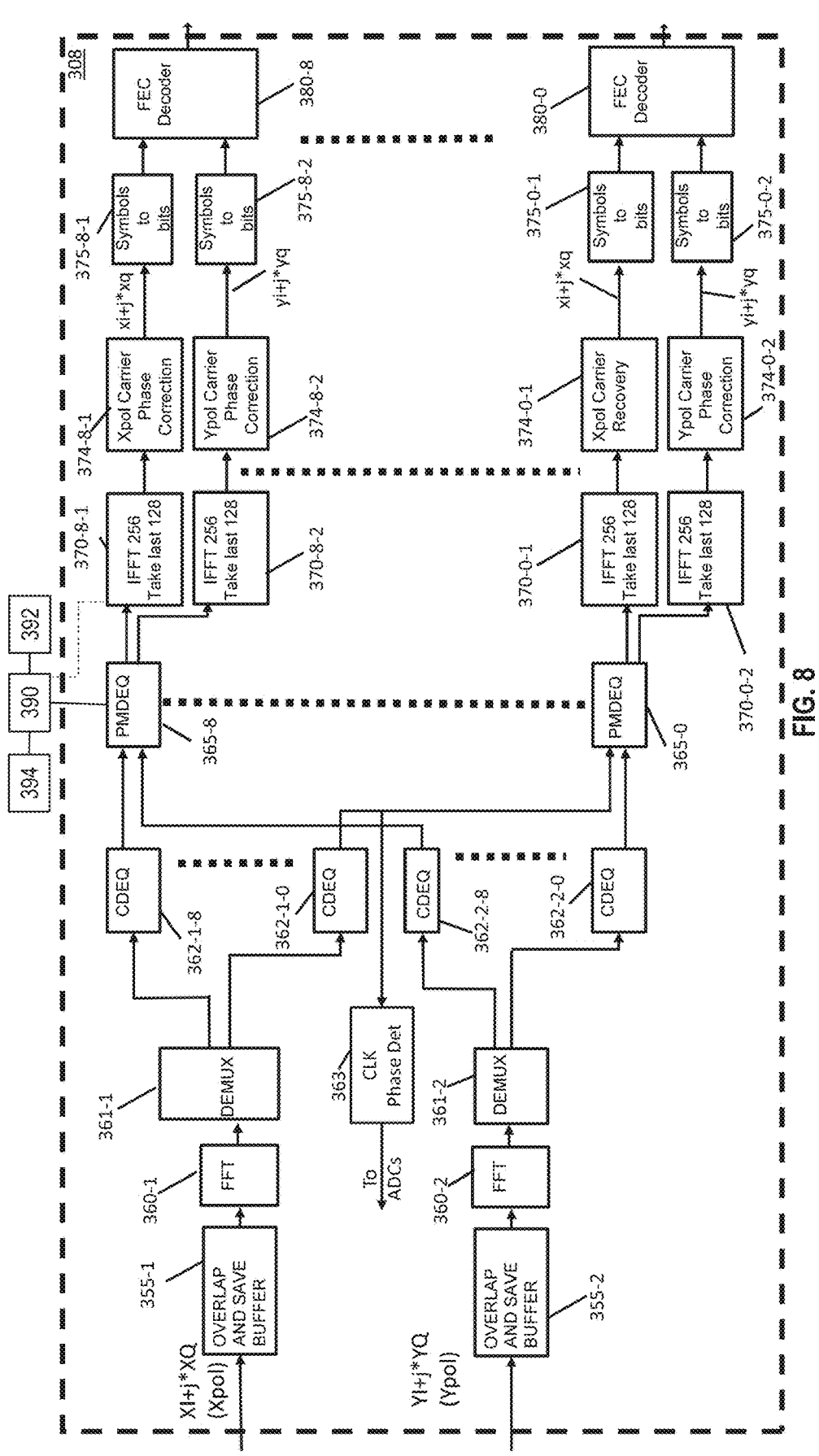
FIG. 8 is a diagram showing an exemplary embodiment of a secondary node receiver DSP consistent with the present disclosure.

Referring now to FIG. 8, shown therein is a diagram of an exemplary implementation of the receiver DSP 308 constructed in accordance with the present disclosure. As noted above, ADCs 340 (analog-to-digital (A/D) circuits) (FIG. 7) output digital samples corresponding to the analog inputs supplied thereto. In one example, the samples may be supplied by each ADC 340 at a rate of 64 GSamples/s. The digital samples correspond to symbols carried by the X polarization of the optical subcarriers and may be represented by the complex number XI+jXQ. The digital samples may be provided to a first overlap and save buffer 355-1, as shown in FIG. 8. A first FFT component 360-1 may receive 2048 vector elements, for example, from the first overlap and save buffer 355-1 and convert the vector elements to the frequency domain using, for example, a fast Fourier transform (FFT). The first FFT component 360-1 may convert the 2048 vector elements to 2048 frequency components, each of which may be stored in a register or "bin" or other memory, as a result of carrying out the FFT.

The frequency components then may be demultiplexed by a first demultiplexer 361-1, and groups of such components may be supplied to a respective one of first chromatic dispersion equalizer circuits 362-1, i.e., to first CDEQ circuits 362-1-0 to 362-1-8, each of which may include a finite impulse response (FIR) filter that corrects, offsets, or reduces the effects of, or errors associated with, chromatic dispersion of the transmitted optical subcarriers. Each of first CDEQ circuits 362-1-0 to 362-1-8 supplies an output to a corresponding first polarization mode dispersion (PMD) equalizer circuit 365-0 to 365-8 (which individually or collectively may be referred to as PMDEQ circuits 365).

Digital samples output from second ACDs 340-2 associated with Y polarization components of subcarrier SC1 may be processed in a similar manner to that of digital samples output from first ACDs 340-1 and associated with the X polarization component of each subcarrier. Namely, a second overlap and save buffer 355-2, a second FFT 360-2, a second demultiplexer 361-2, and second CDEQ circuits 362-2-0 to 362-2-8 may have a similar structure and operate in a similar fashion as the first overlap and save buffer 355-1, the first FFT 360-1, the first demultiplexer 361-1, and the first CDEQ circuits 362-1-0 to 362-1-8, respectively. For example, each of the second CDEQ circuits 362-2-0 to 362-8 may include an FIR filter that corrects, offsets, or reduces the effects of, or errors associated with, chromatic dispersion of the transmitted optical subcarriers. In addition, each of the second CDEQ circuits 362-2-0 to 362-2-8 provide an output to a corresponding one of PMDEQs 365-0 to 365-8.

As further shown in FIG. 8, the output of one of the CDEQ circuits 362, such as CDEQ 362-1-0 may be supplied to a clock phase detector circuit 363 to determine a clock phase or clock timing associated with the received subcarriers. Such phase or timing information or data may be supplied to the first and second ADCs 340-1 and 340-2 to adjust or control the timing of the digital samples output from the first and second ADCs 340-1 and 340-2.

In one implementation, phase or timing information or data may be supplied to a particular ADC 340 to adjust or control the timing of a digital sample output from the particular ADC 340 corresponding to the pulse 204. In some embodiments, the phase, timing information, and/or data supplied to the particular ADC 340 may include, for example, the phase, timing information, and/or additional spectrum data corresponding to the pulse 204 (which may be retrieved from the first memory 392a by the first processor 390a). In this way, the pulse reflections 212 may have a timing and/or phase that is different from the pulse 204 (and that may be different from the subcarriers SC1-SC7) and may be analyzed independently of the subcarriers SC1-SC7.

In one implementation, for each pulse reflection 212 the receiver DSP 308 does not demodulate the data in the test subcarrier 182. The phase, timing information, and/or data supplied to the particular ADC 340 may include the phase and timing information of the optical tone 180 of the pulse reflection 212 that may be analyzed to determine a phase difference between the optical tone 180 and the plurality of comb lines 190 of the test subcarrier 182 in the pulse reflection 212. In one implementation, the first processor 390a of the receiver DSP 308 may store the phase and/or timing of each pulse reflection 212 in the first memory 392a. In this way, the receiver DSP 308 can measure total dispersion of the optical fiber based on the phase sensitive measurements of the pulse reflection 212 resulting from transmission of the pulse 204 and resulting pulse reflection 212 along the optical fiber links 24a-n. Thus, the width of the test subcarrier 182 determines a sensitivity of the dispersion measurement as the greater number of lines (in the plurality of comb lines 190) the better the uncertainty of the absolute dispersion.

Each of PMDEQ circuits 365 may include another FIR filter that corrects, offsets, or reduces the effects of, or errors associated with, PMD of the transmitted optical subcarriers. Each of PMDEQ circuits 365 may supply a first output to a respective one of first IFFT components or circuits 370-0-1 to 370-8-1 and a second output to a respective one of second IFFT components or circuits 370-0-2 to 370-8-2, each of which may convert a 256-element vector, in this example, back to the time domain as 256 samples in accordance with, for example, an inverse fast Fourier transform (IFFT).

Time domain signals or data output from the first IFFT 370-0-1 to 370-8-1 are supplied to a corresponding one of first Xpol carrier phase correction circuits 374-0-1 to 374-8-1, which may apply carrier recovery techniques to compensate for X polarization transmitter (e.g., laser 120) and receiver (e.g., local oscillator laser 316) linewidths. In some implementations, each first carrier phase correction circuit 374-0-1 to 374-8-1 may compensate or correct for frequency and/or phase differences between the X polarization of the transmit signal and the X polarization of light from the local oscillator laser 316 based on an output of Xpol carrier recovery circuit 374-0-1, which performs carrier recovery in connection with one of the subcarriers SC0-SC7 based on the outputs of the first IFFT 370-0-1. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of the PMDEQ circuits 365 may be updated based on the output of at least one of carrier phase correction circuits 374-0-1 to 374-8-1.

In a similar manner, time domain signals or data output from second IFFT 370-0-2 to 370-8-2 are supplied to a corresponding one of Ypol carrier phase correction circuits 374-0-2 to 374-8-2, which may compensate or correct for Y polarization transmitter (e.g., laser 120) and receiver (e.g., local oscillator laser 316) linewidths. In some implementations, each Ypol carrier phase correction circuit 374-0-2 to 374-8-2 also may correct or compensate for frequency and/or phase differences between the Y polarization of the transmit signal and the Y polarization of light from the local oscillator laser 316. After such Y polarization carrier phase correction, the data associated with the Y polarization component may be represented as symbols having the complex representation yi+j*yq in a constellation, such as a QPSK constellation or a constellation associated with another modulation formation, such as an m-quadrature amplitude modulation (QAM), m being an integer. In some implementations, the output of one of the Ypol carrier correction circuits 374-0-2 to 374-8-2 may be used to update the taps of the FIR filter included in one or more of the PMDEQ circuits 365 instead of, or in addition to, the output of at least one of the Xpol carrier recovery circuits 374-0-1 to 374-8-1.

As further shown in FIG. 8, the output of carrier recovery circuits, e.g., the Xpol carrier recovery circuit 374-0-1, also may be supplied to Xpol carrier phase correction circuits 374-1-1 to 374-8-1 and Ypol carrier phase correction circuits 374-0-2 to 374-8-2, whereby the carrier phase correction circuits 374 may determine or calculate a corrected carrier phase associated with each of the received subcarriers based on one of the recovered carriers, instead of providing multiple carrier recovery circuits, each of which is associated with a corresponding subcarrier. The equalizer, carrier recovery, and clock recovery may be further enhanced by utilizing the known (training) bits that may be included in control signals CNT, for example by providing an absolute phase reference between the transmitted and local oscillator lasers.

Each of a first symbols-to-bits circuits or components 375-0-1 to 375-8-1 may receive the symbols output from a corresponding one of the Xpol carrier phase correction circuits 374-0-1 to 374-8-1 and map the symbols back to bits. For example, each of the first symbol-to-bits components 375-0-1 to 375-8-1 may map one X polarization symbol, in a QPSK or m-QAM constellation, to Z bits, where Z is an integer. For dual-polarization QPSK modulated subcarriers, Z is four. Bits output from each of the first symbol-to-bits components 375-0-1 to 375-8-1 are provided to a corresponding one of FEC decoder circuits 380-0 to 380-8.

Y polarization symbols are output form a respective one of Ypol carrier phase correction circuits 374-0-2 to 374-8-2, each of which has the complex representation yi+j*yq associated with data carried by the Y polarization component. Each Y polarization, like the X polarization symbols noted above, may be provided to a corresponding one of second symbol-to-bit circuits or components 375-0-2 to 375-8-2, each of which has a similar structure and operates in a similar manner as first symbols-to-bits component 375-0-1 to 375-8-1. Each of the second symbol-to-bits circuits 375-0-2 to 375-8-2 may provide an output to a corresponding one of the FEC decoder circuits 380-0 to 380-8.

In another example, data associated with a subcarrier SC received, but not intended for output from that receiver, can be blocked by inserting zeroes (0s) in chromatic dispersion equalizer (CDEQ) circuits 362 associated with both the X and Y polarization components of each subcarrier. In particular, multiplier circuits (provided in corresponding butterfly filter circuits), like multiplier circuits M described above, may selectively multiply the inputs to the particular CDEQ circuit 362 by either zero or a desired coefficient. As multiplication by a zero generates a zero product, such zero products are further processed by corresponding circuitry in receiver DSP 308, e.g., corresponding IFFTs 370, carrier phase correction circuits 374, symbol-to-bits components 375, and FEC decoders 380, a corresponding output of the receiver DSP 308 will also be zero. In one implementation, a subcarrier SC adjacent to the test subcarrier 182 may be blocked. For example, if the test subcarrier 182 is provided in the first optical subcarrier SC0, then the second optical subcarrier SC1, adjacent to the test subcarrier 182 in the first optical subcarrier SC0, may be blocked. Because the second optical subcarrier SC1 is blocked, or "turned off", any data associated with the second optical subcarrier SC1 received may be blocked as described above.

While FIG. 8 shows the receiver DSP 308 as including a particular number and arrangement of functional components, in some implementations, the receiver DSP 308 may include additional functional components, fewer functional components, different functional components, or differently arranged functional components.

Referring now to FIG. 9, shown therein is a diagram of an exemplary embodiment of a transceiver 400 constructed in accordance with the present disclosure. The transceiver 400 is shown as using a shared laser 404 providing optical signals both for transmission and reception (as a local oscillator signal, e.g., such as otherwise from the local oscillator laser 310) in accordance with one or more implementations of the present disclosure. As shown, the laser 404 generates an optical signal and provides the optical signal to the splitter 408. The splitter 408 splits the optical signal into two portions. One portion is provided to the optical hybrids or hybrid mixers 320, while the other portion is provided to modulators 116.

Referring now to FIG. 10, shown therein is a flowchart of an exemplary embodiment of a process 500 that may be carried out in accordance with the present disclosure. In the exemplary implementation, the process 500 generally determines a temperature and/or a seismic pressure across a fiber optic span within the optical fiber submarine cable 20, such as one of the optical fiber links 24-1, 24-2, 24-3, or 24-4. The process 500 generally comprises the steps of: providing a first pulse into an optical signal (step 502); determining a first phase for one or more line of a first pulse reflection (step 504); determining a second phase for one or more line of a second pulse reflection (step 508); determining a dispersion across a first fiber optic span (step 512); and calculating a temperature and/or seismic pressure across the first fiber optic span (step 516).

In one implementation, providing a first pulse into an optical signal (step 502) includes providing the first pulse into the optical signal transmitted in an optical fiber link 24 from the primary node 14 towards the secondary node 30. The optical fiber link 24 may be, for example, a portion of the optical fiber submarine cable 20.

In one implementation, providing a first pulse into an optical signal (step 502) may include providing a swept multi-tone, or swept frequency tones, over time, such as a sawtooth pattern.

In one implementation, determining a first phase for one or more line of a first pulse reflection (step 504) may include determining the first phase for each of the plurality of comb lines 190 of the test subcarrier 182 in a first pulse reflection 212-1, as described above in more detail. The plurality of comb lines 190 may include, for example, hundreds, or thousands, of comb lines 190. The first phase may be considered the first phase at a first end of a fiber optic span.

In one implementation, determining a first phase for one or more line of a first pulse reflection (step 504) may include determining the first phase as the initial phase of the test subcarrier 182 of the pulse 204, for example, when the process 500 is determining the temperature and/or the seismic pressure across the first fiber optic span (e.g., the first optical fiber link 24-1 and the second optical fiber link 24-2) intermediate the primary node 14 and the first optical repeater 26a. In other words, the pulse may be used as a reference pulse to determine the first phase as the first end of the fiber optic span.

In one implementation, when using a swept multi-tone, determining a first phase for one or more line of a first pulse reflection (step 504) may include receiving the first pulse reflection having copies of the sawtooth pattern shifted in time, one sawtooth pattern associated with each optical repeater 26 between the primary node 14 and the secondary node 30. In this way, the first processor 390a of the receiver DSP 308 may continuously measure changes in dispersion for each fiber optic span between two optically adjacent ones of the optical repeaters 26 by comparing the phases of consecutive pulse reflections between the sawtooth patterns associated with the two optically adjacent ones of the optical repeaters 26.

In one implementation, determining a second phase for one or more line of a second pulse reflection (step 508) may include determining the second phase for each of the plurality of comb lines 190 of the test subcarrier 182 in a second pulse reflection 212-2, as described above in more detail. The plurality of comb lines 190 may include, for example, hundreds, or thousands, of comb lines 190. The second phase may be considered the second phase at a second end of the fiber optic span.

In one implementation, determining a dispersion across a first fiber optic span (step 512) may include comparing measurements between the first pulse reflection and the second pulse reflection to determine a span dispersion, e.g., a dispersion caused by the fiber optic span. By determining the first phase at the first end of the fiber optic span and the second phase at the second end of the fiber optic span, the span dispersion may be determined as a dispersion caused by the fiber optic span. The span dispersion may be determined with units of ps/nm/km.

In one implementation, determining a change in a temperature and/or seismic pressure across the first fiber optic span (step 516) may include the first processor 390a utilizing a temperature coefficient of fiber dispersion for the optical fiber links 24a-n of the fiber optic span and the span dispersion to calculate the temperature and/or seismic pressure. The calculated temperature may have millikelvin accuracy. In this way, accurate and absolute dispersion for each fiber optic span between the primary node 14 and the secondary node 30 may be measured at a rate of about 100 ms, thus limiting the temperature and/or seismic activity measurements to about 5 Hz. An exemplary temperature coefficient of fiber dispersion may be, for example, –0.0038 (ps/nm/km)/° C., however, the temperature coefficient of fiber dispersion may be dependent on a specific model or characteristics of the fiber optic cable utilized in the fiber optic span. In one implementation, the change in temperature may be determined, for example, by multiplying the span dispersion by the temperature coefficient of fiber dispersion for the optical fiber links 24a-n of the fiber optic span. In one implementation, the change in pressure may be determined, for example, by multiplying the span dispersion by a pressure coefficient of fiber dispersion for the optical fiber links 24a-n of the fiber optic span as compared between two times, or over a period of time.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

Various modifications and other embodiments will be apparent to those skilled in the art from consideration of the present specification, and the detailed implementations described above are provided as examples. For example, the digital signal process disclosed above may be implemented as a programmable gate array circuit (PGA), or a field programmable gate array circuit (FPGA). In addition, although separate ones of the laser 120 and the local oscillator laser 316 are provided in the transmitter module 46 and coherent receiver 50, respectively, as noted above, a transceiver module 18 consistent with the present disclosure may include a common laser that is "shared" between the transmitter and receiver as shown in FIG. 9.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set. Accordingly, other implementations are within the scope of the claims.

What is claimed is:

1. A transceiver, comprising:

an optical source configured to provide an optical signal into a fiber optic cable having one or more optical repeaters forming one or more fiber optic spans;

a modulator receiving the optical signal, the modulator configured to encode data into a plurality of subcarriers in the optical signal;

a transmitter module having circuitry configured to receive data to be encoded into one or more subcarrier of the plurality of subcarriers of the optical signal, the circuitry including at least one driver circuit supplying drive signals to the modulator to cause the modulator to encode data into a first subcarrier having a first frequency band, and the circuitry configured to cause the modulator to generate a first pulse at a first instance in time and a second pulse at a second instance in time, each of the first pulse and the second pulse comprising a test subcarrier having a test frequency band and an optical tone outside of the test frequency band, into the optical signal, the test frequency band and the first frequency band being different;

a coherent receiver operable to receive the optical signal from the fiber optic cable, the optical signal having a filter spectrum, the filter spectrum being a portion of the optical signal having at least the test subcarrier and the optical tone, the test subcarrier having one or more comb lines; and a digital signal processor operable to:

determine a first phase for each of the one or more comb lines of a first pulse reflection in the filter spectrum corresponding to the first pulse and received at a third instance of time, the first phase being determined using the optical tone of the first pulse reflection as a first reference, the third instance in time being between the first instance in time and the second instance in time;

determine a second phase for each of the one or more comb lines of a second pulse reflection in the filter spectrum corresponding to the first pulse and received at a fourth instance of time, the second phase being determined using the optical tone of the second pulse reflection as a second reference, the fourth instance being between the third instance and the second instance;

determine a first dispersion across a first fiber optic span of the one or more fiber optic spans based at least in part on the first phase and the second phase;

determine a third phase for each of the one or more comb lines of a third pulse reflection in the filter spectrum corresponding to the second pulse and received at a fifth instance of time, the third phase being determined using the optical tone of the third pulse reflection as a third reference, the fifth instance being after the second instance;

determine a fourth phase for each of the one or more comb lines of a fourth pulse reflection in the filter spectrum corresponding to the second pulse and received at a sixth instance of time, the fourth phase being determined using the optical tone of the fourth pulse reflection as a fourth reference, the sixth instance being after the fifth instance;

determine a second dispersion across the first fiber optic span based at least in part on the third phase and the fourth phase; and determine a change to a seismic pressure within the first fiber optic span based on the first dispersion and the second dispersion across the first fiber optic span.

2. The transceiver of claim 1, wherein the fiber optic cable has a temperature coefficient of fiber dispersion; and wherein the digital signal processor is further operable to determine a temperature of the first fiber optic span based on the seismic pressure of the first fiber optic span and the temperature coefficient of fiber dispersion for the fiber optic cable.

3. The transceiver of claim 1, wherein the first frequency band has a first bandwidth and the test frequency band has a test frequency band equal to the first bandwidth.

4. The transceiver of claim 1, wherein the optical signal further comprises a second subcarrier disposed between the test subcarrier and the first subcarrier, the transmitter module further having circuitry to cause the modulator to provide the second subcarrier without encoded data.

5. The transceiver of claim 4, wherein the transmitter module further has circuitry to cause the modulator to encode data into a third subcarrier having a third frequency band adjacent to the first frequency band.

6. The transceiver of claim 1, wherein the optical tone is adjacent the test frequency band.

7. The transceiver of claim 1, wherein each of the first pulse and the second pulse has a pulse width that is less than a propagation duration of the optical signal in the first fiber optic span.

8. The transceiver of claim 1, wherein a duty cycle of the first pulse and the second pulse is greater than a propagation duration of the optical signal across the fiber optic cable.

9. The transceiver of claim 1, wherein each of the one or more optical repeaters has a high loss loopback comprising a fiber Bragg grating having a grating bandwidth and operable to cause a pulse reflection of the optical signal received within the grating bandwidth, and wherein the modulator aligns the test frequency band and the optical tone to the grating bandwidth of the fiber Bragg grating, wherein the pulse reflection of the optical signal includes the test frequency band and the optical tone.

10. The transceiver of claim 9, wherein the first pulse reflection and the third pulse reflection are caused by a first optical repeater of the one or more optical repeaters optically coupled to the first fiber optic span, and the second pulse reflection and the fourth pulse reflection are caused by a second optical repeater of the one or more optical repeaters optically coupled to the first fiber optic span; and wherein calculating the seismic pressure includes calculating the seismic pressure of the first fiber optic span disposed between the first optical repeater and the second optical repeater, based on the first dispersion and the second dispersion.

11. An optical communication system, comprising:

a fiber optic cable having a first span and a second span;

an optical repeater optically disposed on the fiber optic cable between the first span and the second span, the optical repeater operable to receive an optical signal from the first span and transmit a pulse reflection of the optical signal along the first span;

a primary node, comprising:

a transmitter module optically coupled to the first span of the fiber optic cable, the transmitter module operable to transmit the optical signal having a first subcarrier with encoded data, and to transmit a plurality of pulses having a pulse bandwidth encompassing a test subcarrier and an optical tone, onto the optical signal, each pulse of the plurality of pulses having a pulse width and a duty cycle, the transmitter module further providing a reference pulse of the optical signal;

a coherent receiver operable to receive the reference pulse and the pulse reflection and to pass a filter spectrum, the filter spectrum being a portion of the pulse reflection corresponding to the pulse bandwidth; and a digital signal processor operable to:

determine a first dispersion based on a first phase of the reference pulse for a first pulse of the plurality of pulses determined using the optical tone of the reference pulse at a first instance in time, and based on a second phase of the pulse reflection for the first pulse determined using the optical tone of the pulse reflection in the filter spectrum at a second instance in time after the first instance in time;

determine a second dispersion based on a third phase of the reference pulse for a second pulse of the plurality of pulses determined using the optical tone of the reference pulse at a third instance in time after the second instance in time, and based on a fourth phase of the pulse reflection for the second pulse determined using the optical tone of the pulse reflection in the filter spectrum at a fourth instance in time after the third instance in time; and determine a change to a seismic pressure within the first span based on the first dispersion and the second dispersion.

12. The optical communication system of claim 11, wherein the fiber optic cable has a temperature coefficient of fiber dispersion, and wherein the digital signal processor is further operable to determine a temperature of the first span based on the seismic pressure of the first span and the temperature coefficient of fiber dispersion for the fiber optic cable.

13. The optical communication system of claim 11, wherein the transmitter module is further operable to transmit the optical signal having a second subcarrier disposed between the first subcarrier and the test subcarrier, the second subcarrier not having encoded data.

14. The optical communication system of claim 13, wherein the transmitter module is further operable to encode data in a third subcarrier and transmit the optical signal having the third subcarrier adjacent to the first subcarrier.

15. The optical communication system of claim 13, wherein the optical tone is adjacent the test subcarrier.

16. The optical communication system of claim 11, wherein the pulse width is less than a propagation duration between the primary node and the optical repeater.

17. The optical communication system of claim 11, wherein the duty cycle is greater than twice a propagation duration of the optical signal across the fiber optic cable.

18. The optical communication system of claim 11, wherein the optical repeater is a high loss loopback comprising a fiber Bragg grating having a grating bandwidth, and wherein the transmitter module is further operable to transmit each pulse bandwidth aligned with the grating bandwidth.

19. The optical communication system of claim 11, wherein the test subcarrier comprises a repeated data pattern causing a plurality of comb lines in the test subcarrier; and wherein the digital signal processor is further operable to:

determine the first dispersion based on a plurality of first phases corresponding to the plurality of comb lines of the test subcarrier in the reference pulse for a first pulse of the plurality of pulses determined using the optical tone of the reference pulse at a first instance in time, and based on a plurality of second phases corresponding to the plurality of comb lines of the test subcarrier of the pulse reflection for the first pulse determined using the optical tone of the pulse reflection in the filter spectrum at a second instance in time after the first instance in time; and determine the second dispersion based on a plurality of third phases corresponding to the plurality of comb lines of the test subcarrier in the reference pulse for a second pulse of the plurality of pulses determined using the optical tone of the reference pulse at a third instance in time, and based on a plurality of fourth phases corresponding to the plurality of comb lines of the test subcarrier of the pulse reflection for the second pulse determined using the optical tone of the pulse reflection in the filter spectrum at a fourth instance in time after the third instance in time.

20. The optical communication system of claim 11, further comprising a secondary node optically coupled to the second span of the fiber optic cable to receive the optical signal and having a high loss loopback comprising a fiber Bragg grating operable to transmit a second pulse reflection of the optical signal to the primary node; the coherent receiver further operable to receive the second pulse reflection; and the digital signal processor being further operable to:

determine a third dispersion based on a fifth phase of the second pulse reflection for a first pulse of the plurality of pulses determined using the optical tone of the second pulse reflection at a fifth instance in time between the second instance in time and the third instance in time, and based on the second phase of the pulse reflection for the first pulse;

determine a fourth dispersion based on a sixth phase of the second pulse reflection for the second pulse of the plurality of pulses determined using the optical tone of the second pulse reflection at a sixth instance in time after the fourth instance in time, and based on the fourth phase of the pulse reflection for the second pulse; and determine a change to a seismic pressure within the second span based on the third dispersion and the fourth dispersion.

* * * * *